United States Patent
Venkatraman et al.

(10) Patent No.: US 10,516,909 B2
(45) Date of Patent: Dec. 24, 2019

(54) METHOD AND SYSTEM FOR RECOMMENDING DYNAMIC, ADAPTIVE AND NON-SEQUENTIALLY ASSEMBLED VIDEOS

(71) Applicants: N. Dilip Venkatraman, Greater Noida (IN); Savitri Dilip, Greater Noida (IN)

(72) Inventors: N. Dilip Venkatraman, Greater Noida (IN); Savitri Dilip, Greater Noida (IN)

(*) Notice: Subject to any disclaimer, the term of this patent is extended or adjusted under 35 U.S.C. 154(b) by 0 days.

(21) Appl. No.: 15/250,687

(22) Filed: Aug. 29, 2016

(65) Prior Publication Data

US 2018/0014053 A1  Jan. 11, 2018

(51) Int. Cl.
```
G06F 16/78      (2019.01)
H04N 21/25      (2011.01)
H04N 21/231     (2011.01)
H04N 21/232     (2011.01)
H04N 21/239     (2011.01)
H04N 21/258     (2011.01)
H04N 21/262     (2011.01)
H04N 21/845     (2011.01)
H04N 21/2668    (2011.01)
H04N 21/8405    (2011.01)
```

(52) U.S. Cl.
CPC ..... *H04N 21/2668* (2013.01); *G06F 16/7867* (2019.01); *H04N 21/231* (2013.01); *H04N 21/232* (2013.01); *H04N 21/2393* (2013.01); *H04N 21/251* (2013.01); *H04N 21/25875* (2013.01); *H04N 21/25891* (2013.01); *H04N 21/26258* (2013.01); *H04N 21/8405* (2013.01); *H04N 21/8456* (2013.01)

(58) Field of Classification Search
CPC ............. H04N 21/2668; H04N 21/231; H04N 21/232; H04N 21/2393; H04N 21/251
See application file for complete search history.

(56) References Cited

U.S. PATENT DOCUMENTS

| | | | |
|---|---|---|---|
| 7,424,522 B2* | 9/2008 | Perry | G06F 17/2247 707/E17.118 |
| 7,818,764 B2* | 10/2010 | Matz | H04N 7/163 725/34 |
| 9,426,543 B1* | 8/2016 | Li | H04N 21/8586 |
| 9,602,884 B1* | 3/2017 | Eldering | H04H 60/00 |

(Continued)

*Primary Examiner* — Sumaiya A Chowdhury
(74) *Attorney, Agent, or Firm* — Kolisch Hartwell, P.C.

(57) ABSTRACT

The present disclosure provides a system and method for recommending dynamic, adaptive and non-sequentially assembled videos. The method includes reception of a set of preference data and a set of user authentication data. The method includes development of an interest profile of the user. The method includes fetching of the one or more tagged videos. The method includes fragmentation of each tagged video into the one or more tagged fragments and segregation of one or more mapped fragments into one or more logical sets of mapped fragments. The method includes mining of semantic context information from each mapped fragment and each logical set of mapped fragments. The method includes clustering of the one or more logical sets of mapped fragments and assembling of the one or more logical clusters of mapped fragments to obtain a set of assembled videos. The method includes recommendation of the set of assembled videos.

18 Claims, 10 Drawing Sheets

(56) References Cited

U.S. PATENT DOCUMENTS

| | | | |
|---|---|---|---|
| 9,654,360 B1* | 5/2017 | Kellicker | H04L 43/06 |
| 9,875,318 B2* | 1/2018 | Wellen | G06F 17/20 |
| 2002/0131496 A1* | 9/2002 | Vasudevan | H04N 21/2402 |
| | | | 375/240.11 |
| 2002/0191589 A1* | 12/2002 | Vassiliou | H04M 7/1245 |
| | | | 370/352 |
| 2003/0121040 A1* | 6/2003 | Ferman | H04L 12/2805 |
| | | | 725/40 |
| 2007/0250901 A1* | 10/2007 | McIntire | H04N 7/17318 |
| | | | 725/146 |
| 2009/0328104 A1* | 12/2009 | Jones | H04N 7/17318 |
| | | | 725/46 |
| 2013/0166625 A1* | 6/2013 | Swaminathan | H04N 21/64738 |
| | | | 709/203 |
| 2013/0179787 A1* | 7/2013 | Brockmann | G06F 3/04815 |
| | | | 715/719 |
| 2015/0082349 A1* | 3/2015 | Ishtiaq | H04N 21/23418 |
| | | | 725/40 |
| 2016/0191971 A1* | 6/2016 | Benitez | H04N 21/4333 |
| | | | 725/34 |

* cited by examiner

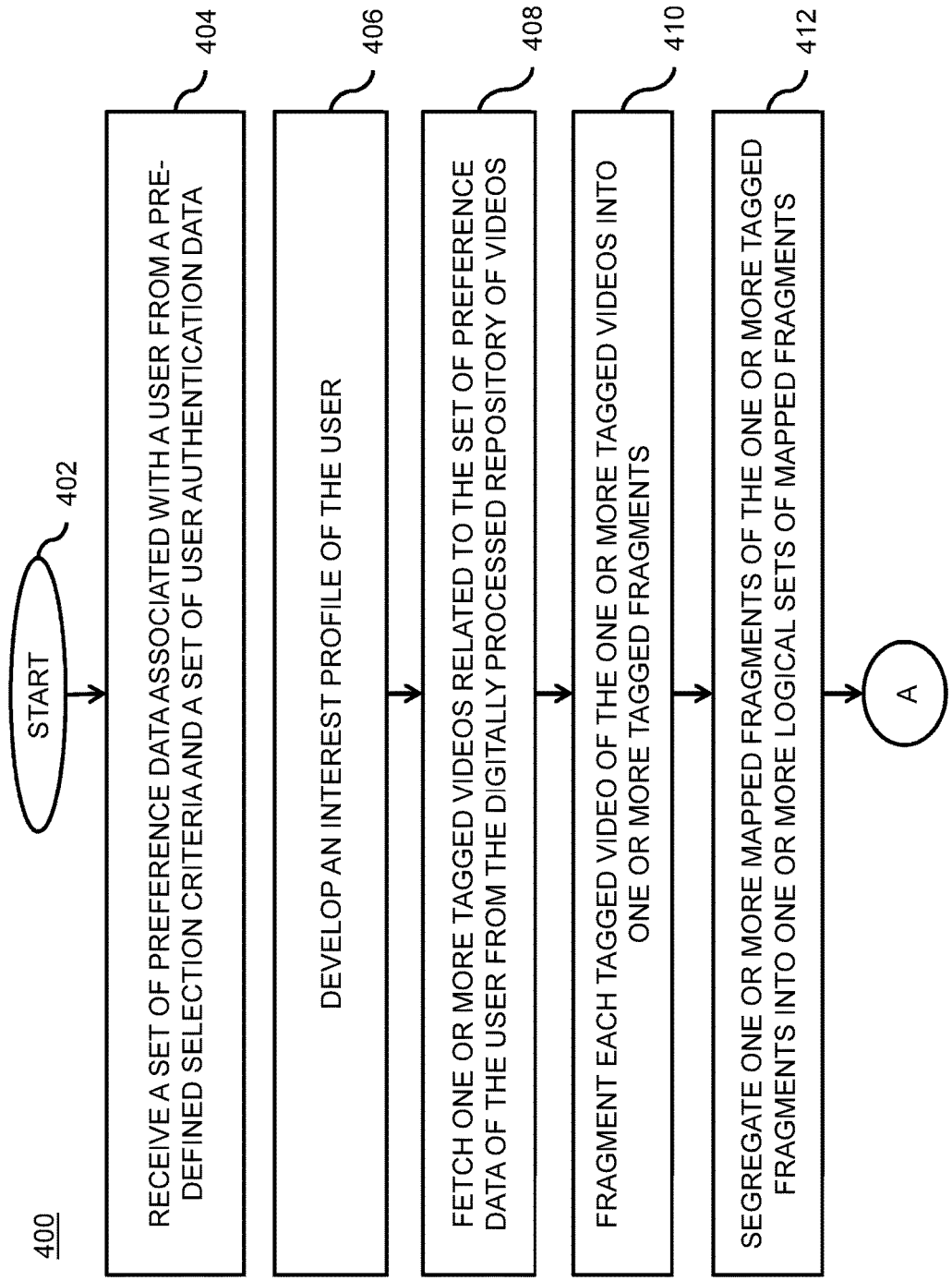

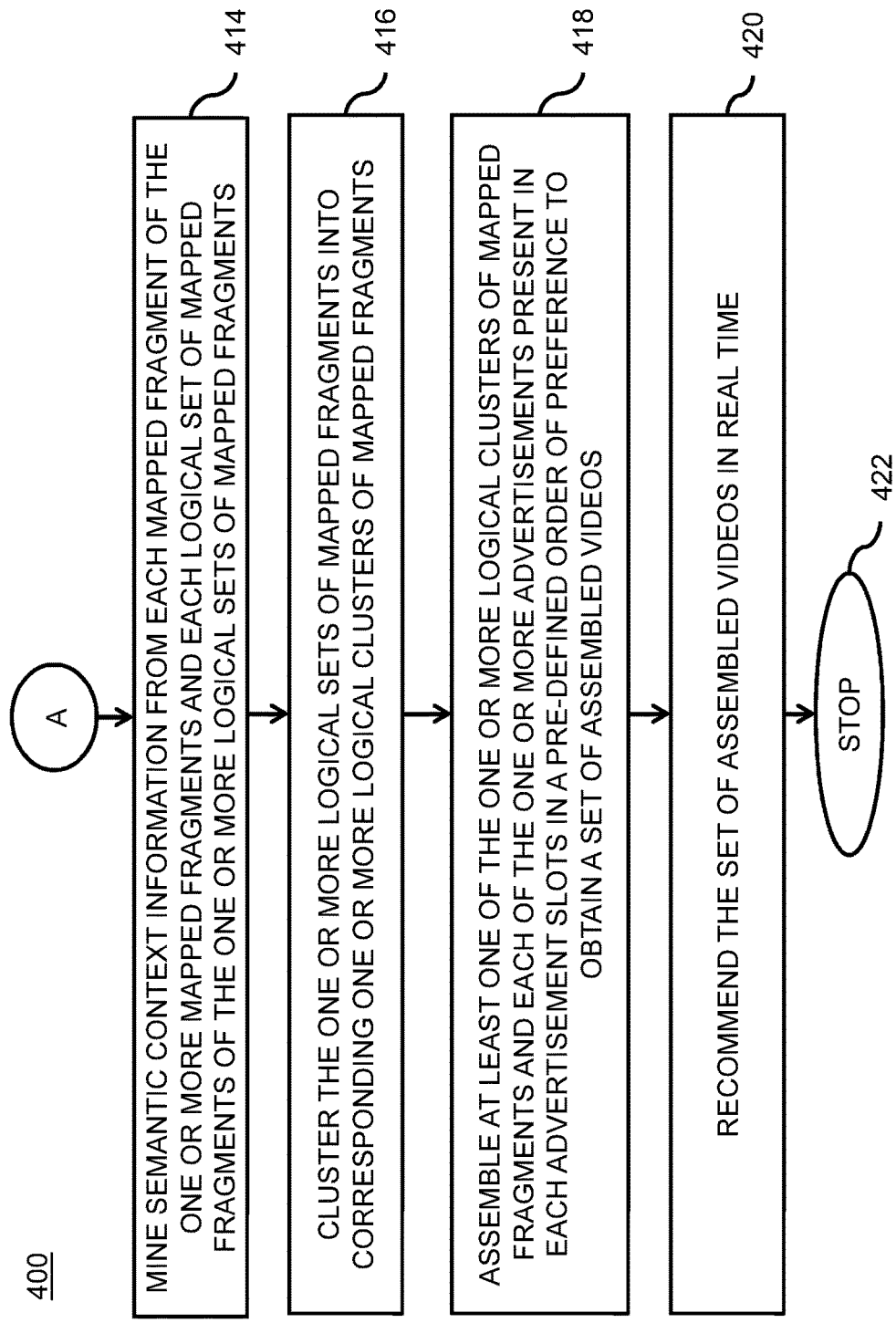

METHOD AND SYSTEM FOR RECOMMENDING DYNAMIC, ADAPTIVE AND NON-SEQUENTIALLY ASSEMBLED VIDEOS

TECHNICAL FIELD

The present disclosure relates to a field of online video streaming. More specifically, the present disclosure relates to a method and system for recommending dynamic, adaptive and non-sequentially assembled videos.

BACKGROUND

With the advent of online multimedia revolution along with sudden rise in network bandwidth in recent years, the popularity of online video on demand platforms has suddenly gained momentum. These video on demand platforms provide a plethora of online streaming services. These services include television news, sports shows, television shows, non-televised shows, interviews, location specific events, national events, international events, movies and the like. The videos are arranged in different categories with different tags for complete video. Nowadays, there are many platforms that provide video assembling services on multiple on demand platforms. These platforms assemble videos based on complete set of tags and don't take into account dynamically changing user interests. In addition, these platforms don't perform dynamic meta-tagging based context and ontology of search queries of users on fragments of videos. The present platforms are inefficient in providing personalized assembled videos to individual users.

SUMMARY

In one aspect, the present disclosure provides a method for recommending one or more dynamic, adaptive and non-sequentially assembled videos. The method includes a step of receiving a set of preference data and a set of user authentication data. The set of preference data is associated with a user and selected from pre-defined selection criteria. The method includes another step of developing an interest profile of the user. Further, the method includes yet another step of fetching the one or more tagged videos related to the set of preference data of the user from the digitally processed repository of videos. The method includes yet another step of fragmenting each tagged video of the one or more tagged videos into the one or more tagged fragments. Furthermore, the method includes yet another step of segregating one or more mapped fragments of the one or more tagged fragments into one or more logical sets of mapped fragments. The method includes yet another step of mining semantic context information from each mapped fragment of the one or more mapped fragments and each logical set of mapped fragments of the one or more logical sets of mapped fragments. The method includes yet another step of clustering the one or more logical sets of mapped fragments into corresponding one or more logical clusters of mapped fragments. The method includes yet another step of assembling at least one of the one or more logical clusters of mapped fragments to obtain a set of assembled videos. The one or more logical clusters of mapped fragments are assembled in in a pre-defined order of preference. In addition, the method includes yet another step of recommending the set of assembled videos in real time. The predefined selection criteria correspond to a digitally processed repository of videos. The interest profile is developed based on an analysis of a set of statistical data. The one or more tagged videos are fetched based on a correlation of a set of tags associated with each video of the one or more tagged videos with the set of preference data associated with the user. Each tagged video is fragmented into the one or more tagged fragments and each tagged fragment is characterized by a pre-determined interval of time. Each tagged video is fragmented based on segmentation of the tagged video for each pre-determined interval of time. The one or more mapped fragments are segregated based on a positive mapping of keywords from the set of preference data with the set of tags associated with each tagged fragment of the one or more tagged fragments. The semantic context information includes an object specific context information and scene specific context information of each mapped fragment and each logical set of mapped fragments. Each logical cluster of mapped fragments is assembled based on the analysis of the semantic context information and the set of preference data. The set of assembled videos are recommended based on the analysis of the semantic context information and the interest profile of the user. The set of assembled videos are recommended through one or more techniques.

In an embodiment of the present disclosure, the method further includes yet another step of creating a user profile based on the received set of user authentication data and the set of preference data. The user profile includes the set of preference data that is segregated on the basis of pre-defined selection criteria, the set of user authentication data, the past set of preference data, a physical access location of the user and a bio data of the user. The set of user authentication data includes an email address, a bio data of the user, an authentication key, a physical location and a time of request of video.

In an embodiment of the present disclosure, the method further includes yet another step of transcoding the set of assembled videos into a pre-defined video format. The set of assembled video is transcoded by utilizing a codec. Each of the set of assembled videos are transcoded to enable adaptive bitrate streaming on each communication device of the one or more communication devices associated with the user. The adaptive bitrate streaming is enabled based on one or more device parameters and one or more network parameters. The one or more device parameters includes screen size, screen resolution and pixel density. The one or more network parameters include an IP address, network bandwidth, maximum bitrate support over network, throughput, connection strength and location of requesting server.

In an embodiment of the present disclosure, the method further includes rendering the set of assembled videos for addition of one or more interactive elements and bi-directional flow.

In an embodiment of the present disclosure, the method further includes updating the set of assembled videos, the user profile of the user, the interest profile of the user and the set of authentication data in the real time. In addition, the set of assembled videos are updated in the digitally processed repository of videos and the user profile is updated based on variations in the set of preference data.

In an embodiment of the present disclosure, the set of statistical data includes the current set of preference data, a past set of preference data, the set of user authentication data, a physical location of the user and a bio data of the user. The set of user authentication data includes an email address, a user id, an authentication key and a time of request of video. The bio data of the user includes a first name, a middle name, a last name, a nickname, gender and a chronological age.

In an embodiment of the present disclosure, the pre-defined selection criteria are based on date, time zone, day, season, physical location, occasion, an identified name and a video genre.

In an embodiment of the present disclosure, the pre-defined order of preference is derived from the set of preference data, the semantic context information, an interest profile, a user profile and user profiles of any user having similar preferences.

In an embodiment of the present disclosure, each tagged video of the one or more tagged videos is manually tagged by at least one of one or more publishers.

In an embodiment of the present disclosure, each tagged video of the one or more tagged videos is manually tagged by at least one of one or more system administrators.

In an embodiment of the present disclosure, each tagged video of the one or more tagged videos is tagged based on voice instructions of one or more system administrators.

In an embodiment of the present disclosure, each tagged video of the one or more tagged videos is tagged based on audio rendering and analysis.

In an embodiment of the present disclosure, the one or more techniques include a pop up notification, a thumbnail based sidebar list, a dropdown list, an expandable list and one or more graphic tickers. In addition, the one or more techniques include a redirection to a new web page and an email notification.

In another aspect, the present disclosure provides a computer system. The computer system includes one or more processors and a memory. The memory is coupled to the one or more processors. The memory is used to store instructions. The instructions in the memory when executed by the one or more processors cause the one or more processors to perform a method. The one or more processors perform the method for recommending one or more dynamic, adaptive and non-sequentially assembled videos. The method includes a step of receiving a set of preference data and a set of user authentication data. The set of preference data is associated with a user and selected from pre-defined selection criteria. The method includes another step of developing an interest profile of the user. Further, the method includes yet another step of fetching the one or more tagged videos related to the set of preference data of the user from the digitally processed repository of videos. The method includes yet another step of fragmenting each tagged video of the one or more tagged videos into the one or more tagged fragments. Furthermore, the method includes yet another step of segregating one or more mapped fragments of the one or more tagged fragments into one or more logical sets of mapped fragments. The method includes yet another step of mining semantic context information from each mapped fragment of the one or more mapped fragments and each logical set of mapped fragments of the one or more logical sets of mapped fragments. The method includes yet another step of clustering the one or more logical sets of mapped fragments into corresponding one or more logical clusters of mapped fragments. The method includes yet another step of assembling at least one of the one or more logical clusters of mapped fragments to obtain a set of assembled videos. The one or more logical clusters of mapped fragments are assembled in in a pre-defined order of preference. In addition, the method includes yet another step of recommending the set of assembled videos in real time. The predefined selection criteria correspond to a digitally processed repository of videos. The interest profile is developed based on an analysis of a set of statistical data. The one or more tagged videos are fetched based on a correlation of a set of tags associated with each video of the one or more tagged videos with the set of preference data associated with the user. Each tagged video is fragmented into the one or more tagged fragments and each tagged fragment is characterized by a pre-determined interval of time. Each tagged video is fragmented based on segmentation of the tagged video for each pre-determined interval of time. The one or more mapped fragments are segregated based on a positive mapping of keywords from the set of preference data with the set of tags associated with each tagged fragment of the one or more tagged fragments. The semantic context information includes an object specific context information and scene specific context information of each mapped fragment and each logical set of mapped fragments. Each logical cluster of mapped fragments is assembled based on the analysis of the semantic context information and the set of preference data. The set of assembled videos are recommended based on the analysis of the semantic context information and the interest profile of the user. The set of assembled videos are recommended through one or more techniques.

In yet another aspect, the present disclosure provides a computer-readable storage medium. The computer readable storage medium enables encoding of computer executable instructions. The computer executable instructions when executed by at least one processor perform a method. The at least one processor performs the method for recommending one or more dynamic, adaptive and non-sequentially assembled videos. The method includes a step of receiving a set of preference data and a set of user authentication data. The set of preference data is associated with a user and selected from pre-defined selection criteria. The method includes another step of developing an interest profile of the user. Further, the method includes yet another step of fetching the one or more tagged videos related to the set of preference data of the user from the digitally processed repository of videos. The method includes yet another step of fragmenting each tagged video of the one or more tagged videos into the one or more tagged fragments. Furthermore, the method includes yet another step of segregating one or more mapped fragments of the one or more tagged fragments into one or more logical sets of mapped fragments. The method includes yet another step of mining semantic context information from each mapped fragment of the one or more mapped fragments and each logical set of mapped fragments of the one or more logical sets of mapped fragments. The method includes yet another step of clustering the one or more logical sets of mapped fragments into corresponding one or more logical clusters of mapped fragments. The method includes yet another step of assembling at least one of the one or more logical clusters of mapped fragments to obtain a set of assembled videos. The one or more logical clusters of mapped fragments are assembled in in a pre-defined order of preference. In addition, the method includes yet another step of recommending the set of assembled videos in real time. The predefined selection criteria correspond to a digitally processed repository of videos. The interest profile is developed based on an analysis of a set of statistical data. The one or more tagged videos are fetched based on a correlation of a set of tags associated with each video of the one or more tagged videos with the set of preference data associated with the user. Each tagged video is fragmented into the one or more tagged fragments and each tagged fragment is characterized by a pre-determined interval of time. Each tagged video is fragmented based on segmentation of the tagged video for each pre-determined interval of time. The one or more mapped fragments are segregated based on a positive mapping of keywords from the set of preference data with the set of tags associated with each tagged fragment of the one or more tagged fragments. The semantic context information includes an object specific context information and scene specific context information of each mapped fragment and each logical set of mapped fragments. Each logical cluster of mapped fragments is assembled based on the analysis of the semantic context information and the set of preference data. The set of assembled videos are recommended based on the analysis of the semantic context information and the interest profile of the user. The set of assembled videos are recommended through one or more techniques.

BRIEF DESCRIPTION OF THE FIGURES

Figure 1A:
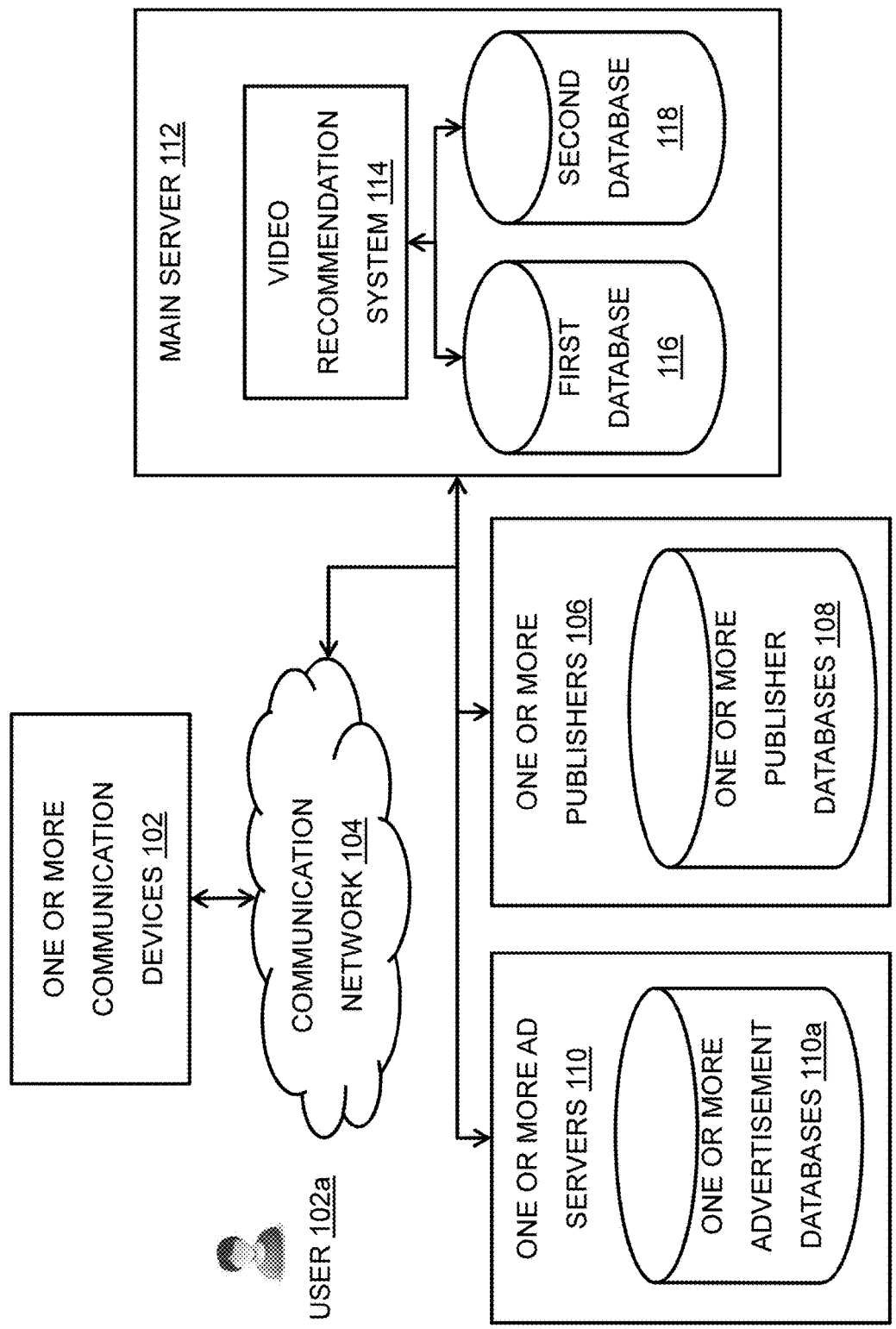
Figure 1B:
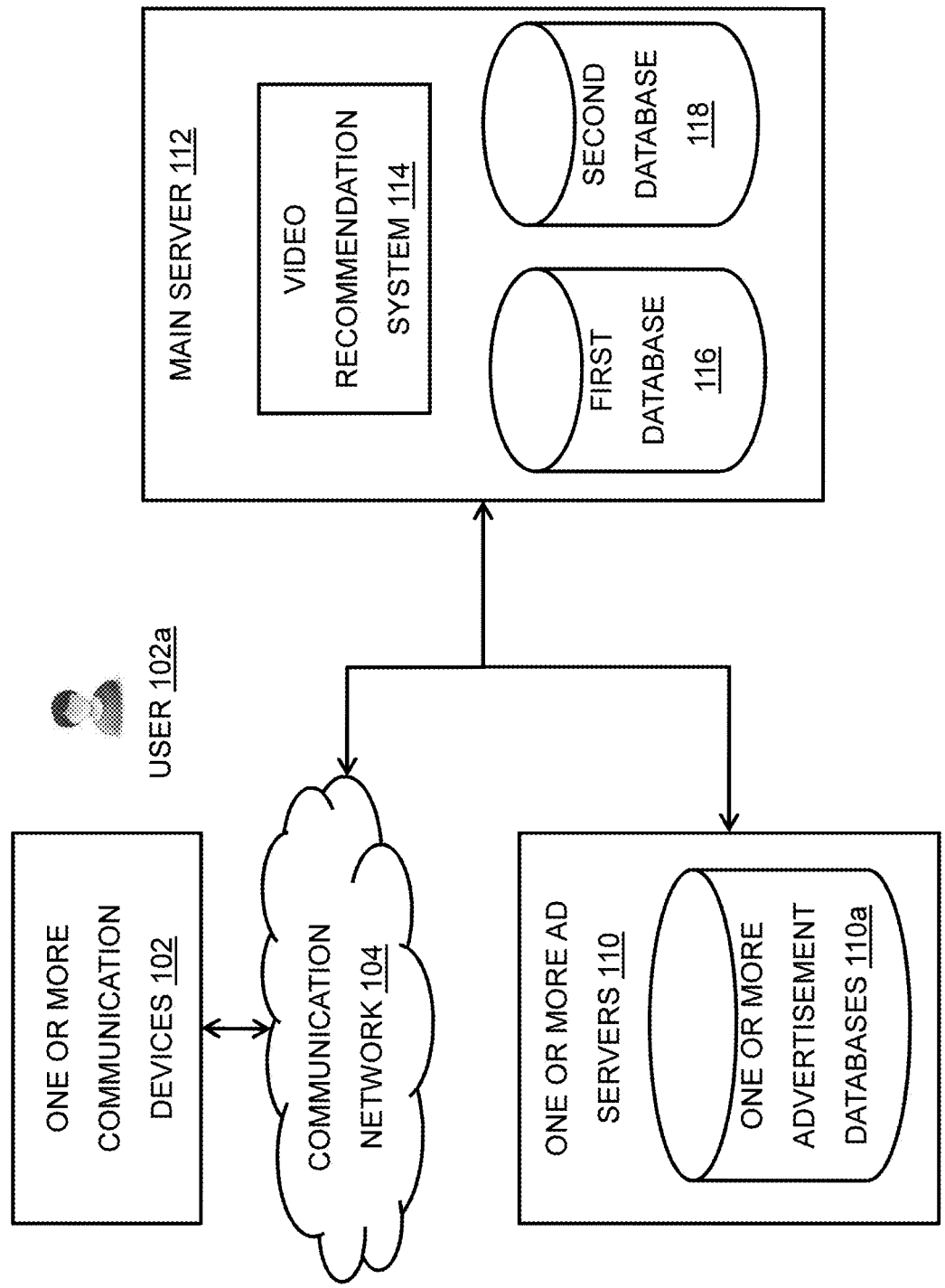
Figure 1C:
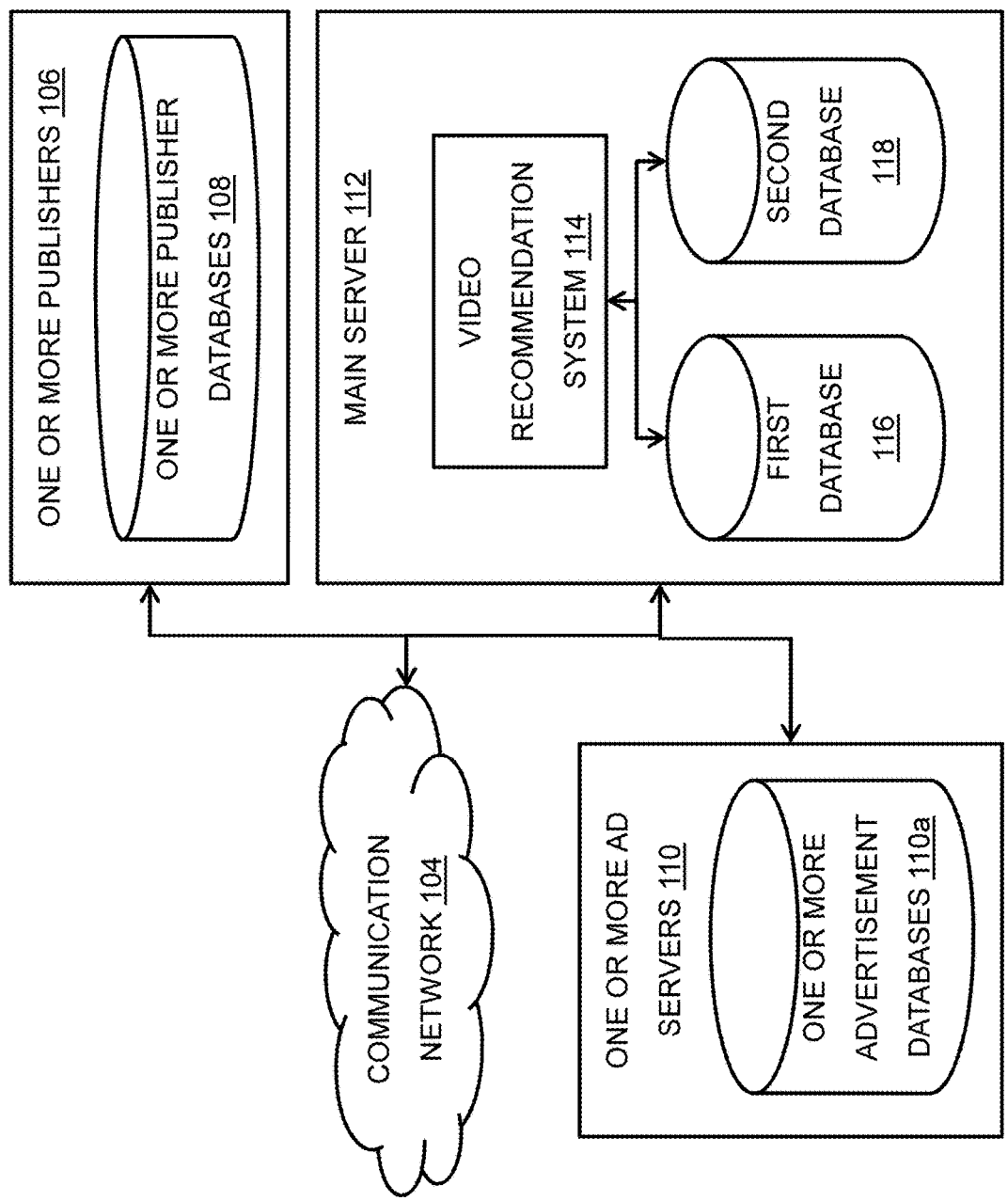
Figure 1D:
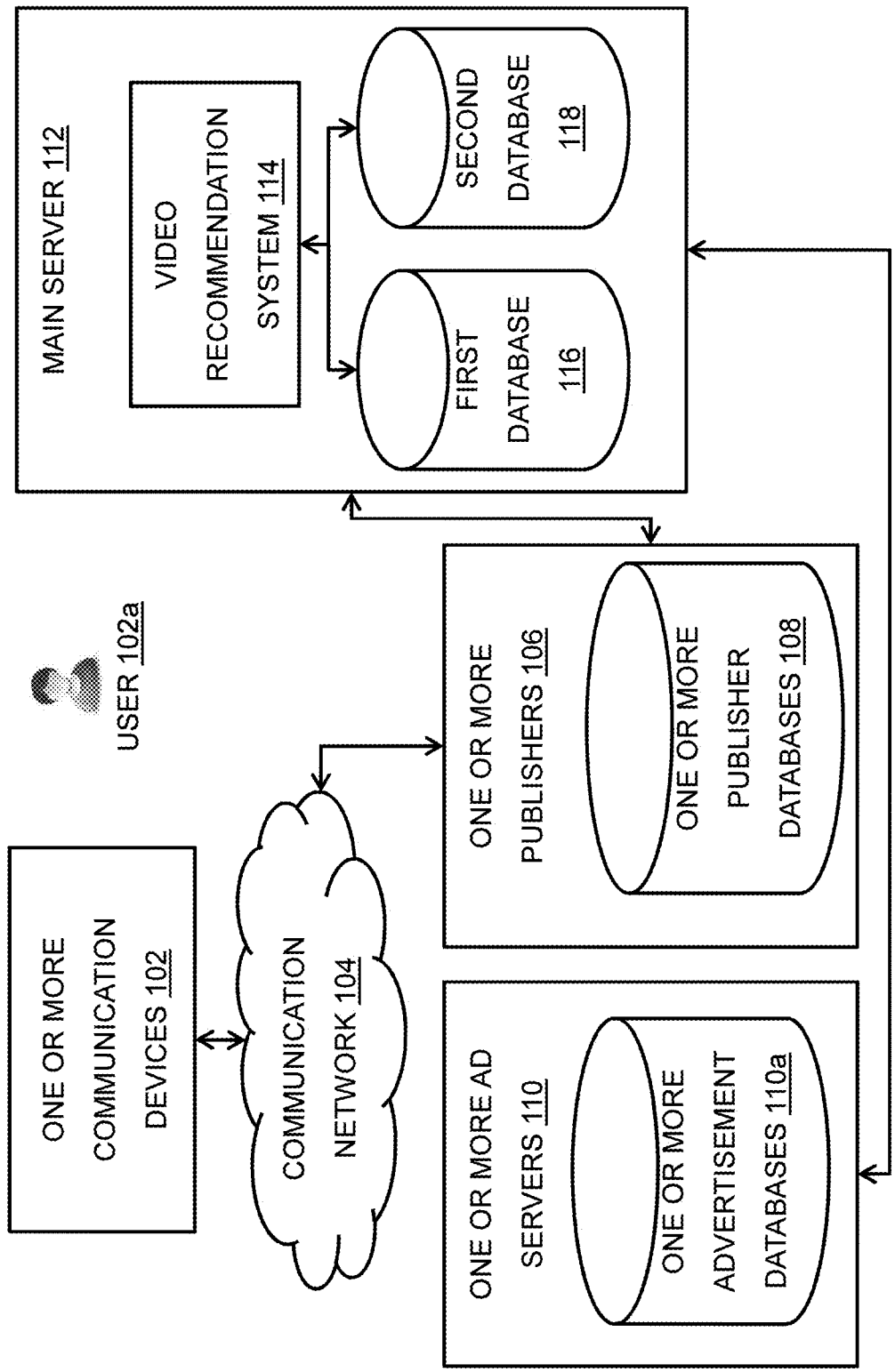
Figure 1E:
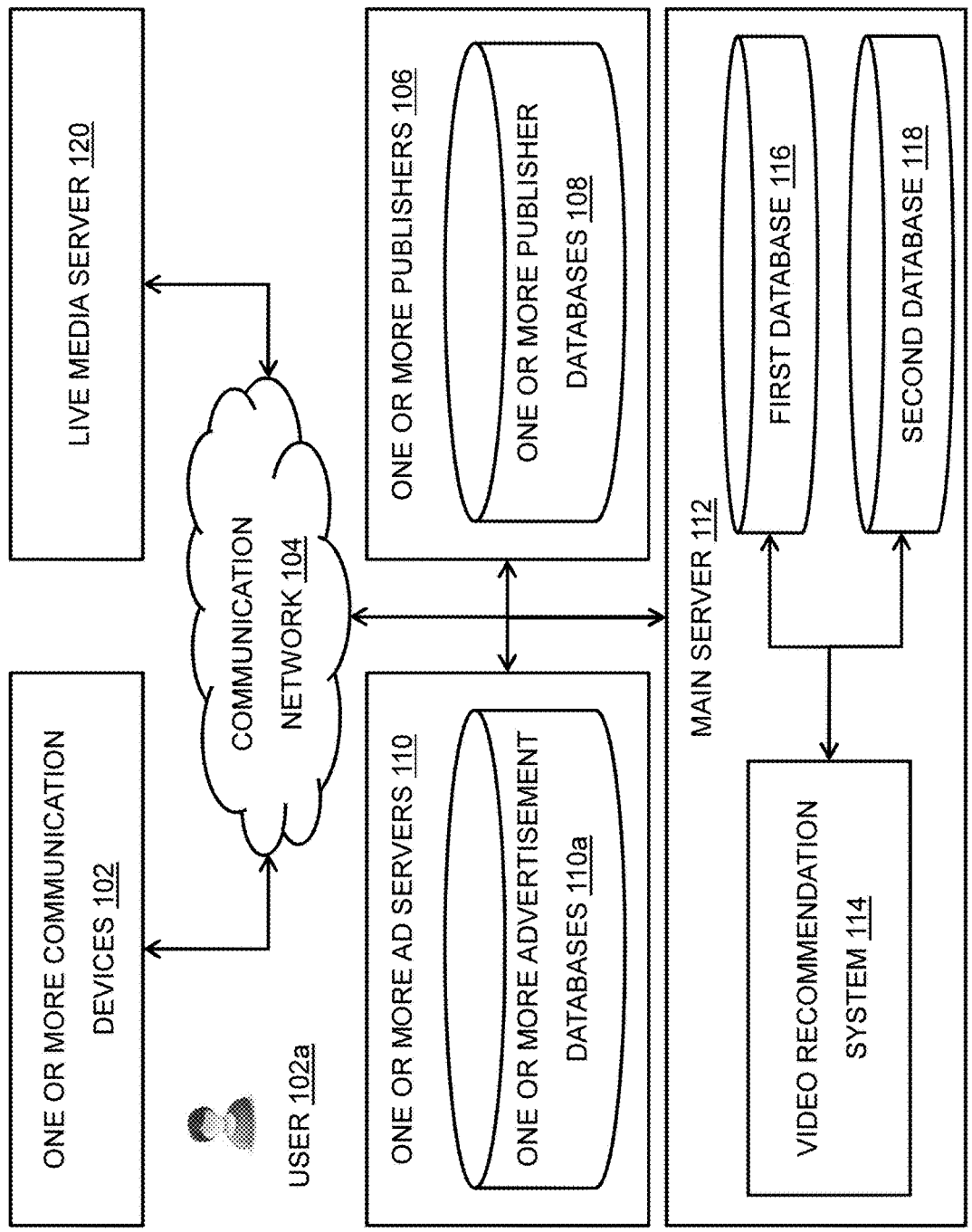
Figure 2:
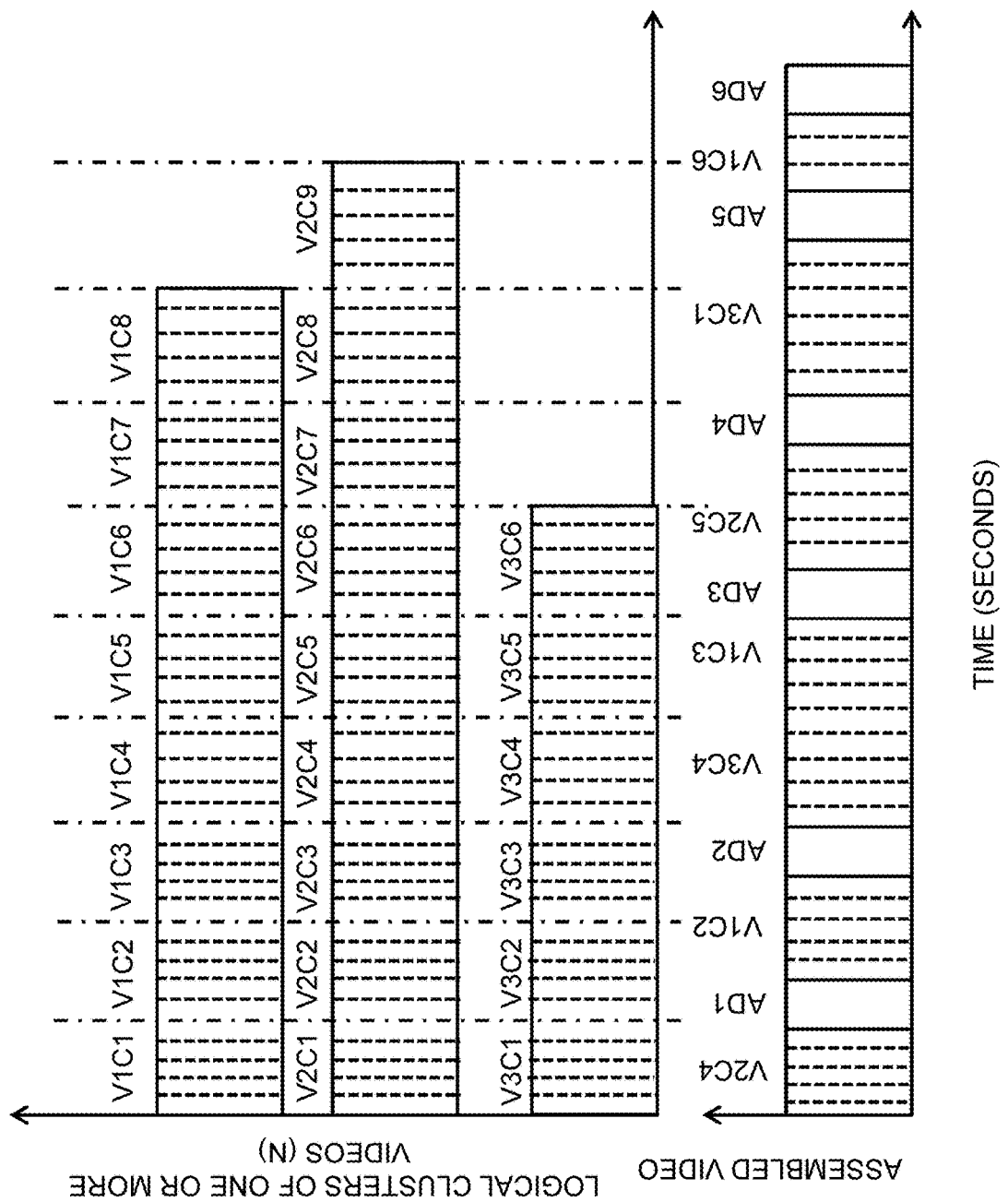
Figure 3:
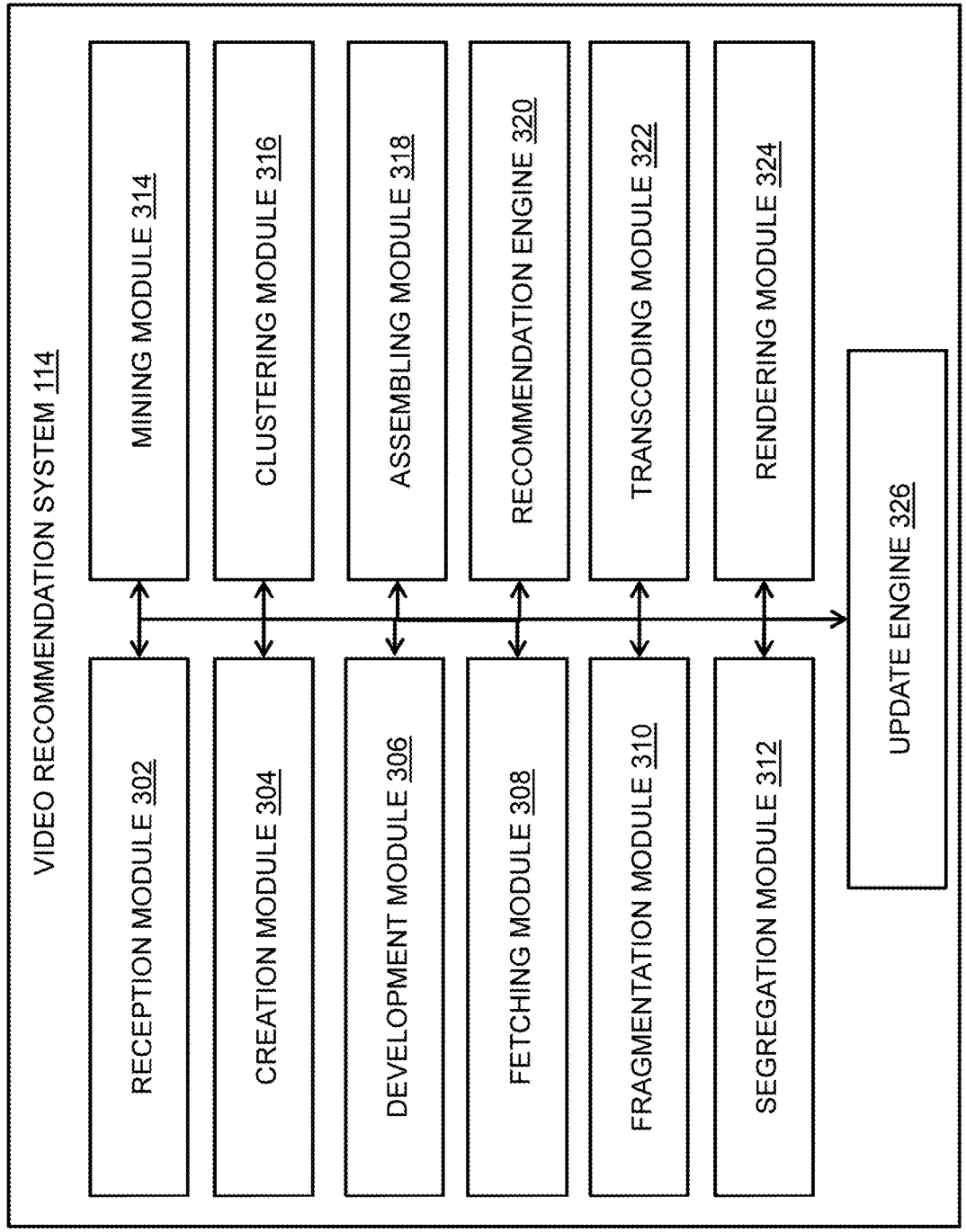
Figure 5:
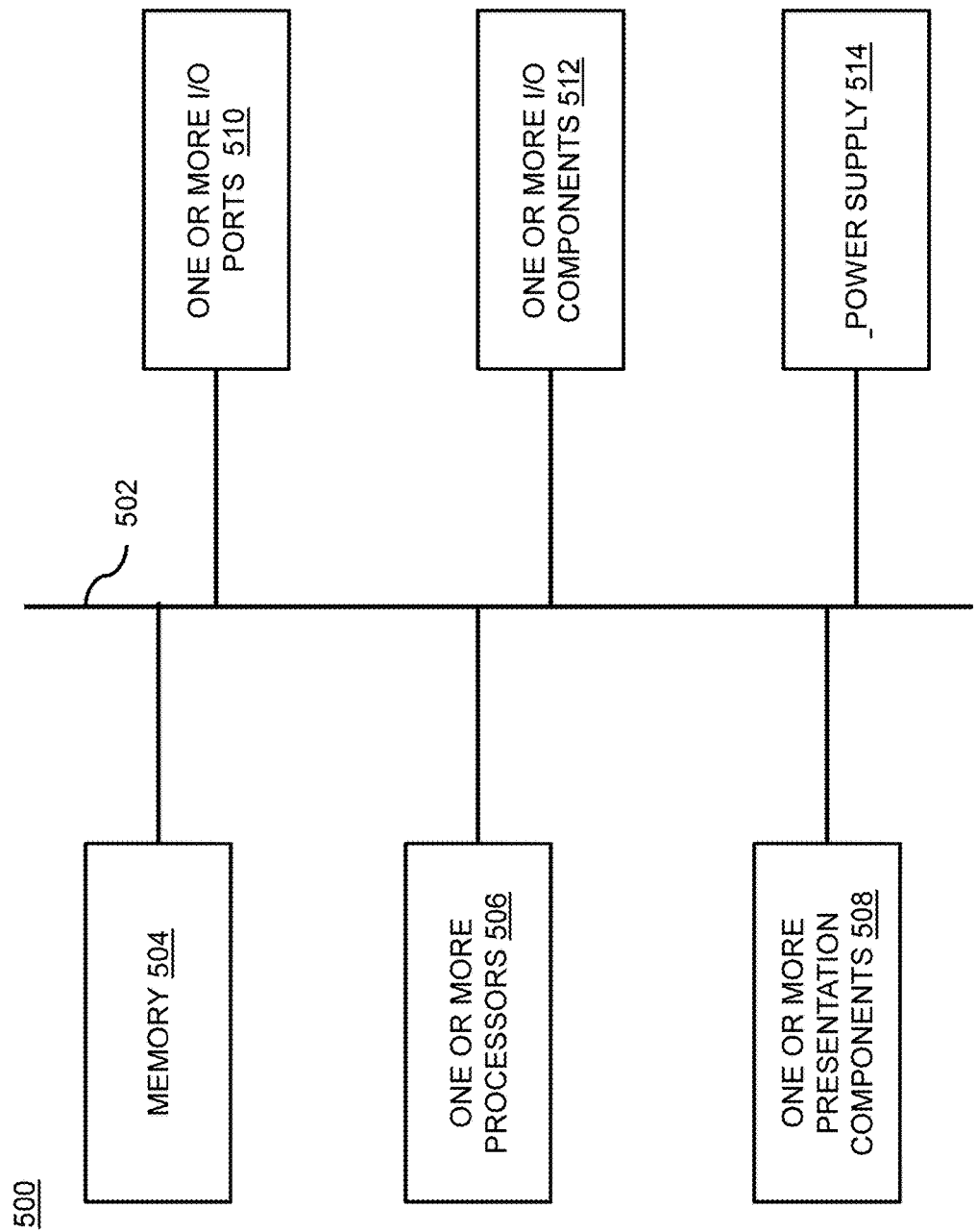

Having thus described the invention in general terms, reference will now be made to the accompanying drawings, which are not necessarily drawn to scale, and wherein:

FIG. 1A illustrates an interaction of a user and one or more publishers with a video recommendation system, in accordance with an embodiments of the present disclosure;

FIG. 1B illustrates the interaction of the user and the one or more advertisers with the video recommendation system, in accordance with another embodiment of the present disclosure;

FIG. 1C illustrates the interaction of the one or more publishers with the video recommendation system, in accordance with yet another embodiment of the present disclosure;

FIG. 1D illustrates the interaction between the user and the one or more publishers associated with the video recommendation system, in accordance with yet another embodiment of the present disclosure;

FIG. 1E illustrates the interaction between a live media server and the video recommendation system, in accordance with yet another embodiment of the present disclosure;

FIG. 2 illustrates an example of a real time, dynamic, adaptive and non-sequential assembling of one or more tagged clips corresponding to one or more videos;

FIG. 3 illustrates a block diagram of the video recommendation system, in accordance with various embodiments of the present disclosure;

FIGS. 4A and 4B illustrate a flow chart for recommending one or more dynamic, adaptive and non-sequentially assembled videos, in accordance with various embodiments of the present disclosure; and FIG. 5 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1A illustrates an interaction of a user 102a and one or more publishers 106 with a video recommendation system 114 and one or more ad servers 110, in accordance with an embodiments of the present disclosure. The interaction of the user 102a with the video recommendation system 114 describes an interactive environment where the user 102a is recommended with a set of assembled videos based on an interest profile. The interest profile of the user 102a is developed based on a set of statistical data.

Moreover, the interaction of the user 102a and the one or more publishers 106 with the video recommendation system 114 is based on a pay per view and subscription based model. Each of the one or more ad servers 110 provide one or more advertisements for a real time insertion in corresponding ad slots present between each assembled video of the set of assembled videos. In an embodiment of the present disclosure, the interaction of the one or more advertisers 110 with the video recommendation system 114 is based on a pay per view model. In another embodiment of the present disclosure, the interaction of the one or more advertisers 110 with the video recommendation system 114 is based on a revenue sharing model. The above interaction of the user 102a, the one or more advertisers 110 and the one or more publishers 106 is part of the interactive environment. The interactive environment includes a communication device 102, a communication network 104, one or more communication devices 106, the one or more publishers 106, the one or more ad servers 110 and a main server 112.

The user 102a is associated with the one or more communication devices 102. Each of the one or more communication devices 102 may be any suitable device with at least a display, a storage unit and network connectivity. In an embodiment of the present disclosure, each of the one or more communication devices 102 is a portable communication device. Example of the portable communication device includes a laptop, a smart phone, a tablet and the like. In another embodiment of the present disclosure, each of the one or more communication devices 102 is a fixed communication device. Examples of the fixed communication device include a desktop, a workstation PC and the like. Each of the one or more communication devices 102 runs on an operating system. In general, the operating system provides an interface for the user 102a to interact with hardware of each of the one or more communication devices 102 and other connected devices. In an example, the operating system installed in the one or more communication devices 102 is a Windows based operating system. In another example, the operating system installed in the one or more communication devices 102 is a Mac based operating system. In yet another embodiment of the present disclosure, the operating system installed in the one or more communication devices 102 is a Linux based operating system. In yet another example, the operating system installed in the one or more communication devices 102 is a mobile operating system. Example of the mobile operating system includes but may not be limited to Android operating system, Apple iOS, Symbian based operating system, BADA operating system and blackberry operating system.

The one or more communication devices 102 are connected to the main server 112 through the communication network 104. In general, the communication network 104 is a part of a network layer responsible for connection of two or more communication devices. Further, the communication network 104 may be any type of network. In an embodiment of the present disclosure, the type of communication network 104 is a wireless mobile network. In another embodiment of the present disclosure, the type of communication network 104 is a wired network with a finite bandwidth. In yet another embodiment of the present disclosure, the type of communication network 104 is a combination of the wireless and the wired network for the optimum throughput of data transmission. In yet another embodiment of the present disclosure, the type of communication network 104 is an optical fiber high bandwidth network that enables a high data rate with negligible connection drops.

The communication network 104 includes a set of channels. Each channel of the set of channels supports a finite bandwidth. The finite bandwidth of each channel of the set of channels is based on capacity of the communication network 104. Further, the one or more communication devices 102 possesses a unique machine address (hereinafter "MAC"). The MAC uniquely identifies the identity of each of the one or more communication devices 102 over the communication network 104. In addition, the communication network 104 provides a unique identity to each of the one or more communication devices 102. The unique identity is often referred to as an internet protocol (hereinafter "IP") address. In general, an IP address is a unique string of numbers separated by full stops that identify the one or more communication devices 102 using IP to communicate over the communication network 104. The IP address is characterized by IP versions. In an embodiment of the present disclosure, the IP address assigned to the one or more communication devices 102 is an IPv4 address. In another embodiment of the present disclosure, the IP address assigned to the one or more communication devices 102 is an IPv6 address.

The one or more communication devices 102 accesses data over the communication network 104 by utilizing one or more applications. The one or more applications include but may not be limited to a web browser, a mobile application, a widget and web applets. In general, each of the one or more applications have a graphical user interface (hereinafter "GUI") that is designed to display and fetch data from the main server 112. In addition, each of the one or more applications on any of the one or more communication devices associated with the user 102a may provide an interface for real time streaming, uploading and downloading of video files and audio files. The web browser installed in the one or more communication devices 102 may be any web browser. Example of the web browsers includes Google Chrome, Mozilla Firefox, Opera, UC Web, Safari, Internet Explorer and the like. In addition, the mobile application installed in at least one of the one or more communication devices 102 may be based on any mobile platform. Examples of the mobile platform include but may not be limited to Android, iOS Mobile, Blackberry and Bada.

Further, the one or more ad servers 110 are associated with one or more advertisers. Each ad server of the one or more ad servers 110 is a provider of advertisements. Each advertiser of the one or more advertisers is a brand promoter. In addition, each advertiser is a promoter of brands, services and the like. Each ad server is manually or programmatically configured to manage serving of at least one advertisement present in an advertisement database of one or more advertisement databases 110a. Each advertisement database of the one or more advertisement databases 110a includes one or more advertisement. Each advertisement may be present in any format. In an embodiment of the present disclosure, each advertisement is present in each advertisement database of the one or more advertisement databases 110a in a video format. In another embodiment of the present disclosure, each advertisement is present in each advertisement database of the one or more advertisement databases 110a in a text based format. In yet another embodiment of the present disclosure, each advertisement is present in each advertisement database of the one or more advertisement databases 110a in a static image format. In yet another embodiment of the present disclosure, each advertisement is present in each advertisement database of the one or more advertisement databases 110a in an animated GIF format. In yet another embodiment of the present disclosure, each advertisement is present in each advertisement database of the one or more advertisement databases 110a in a flash format.

Each advertisement video present in the one or more advertisement databases 110 may be tagged by at least one of one or more administrators and one or more advertisers. In an embodiment of the present disclosure, each advertisement is tagged with ad tags. The ad tags may include but not limited to brand name, brand ambassador, brand taglines and category of brand. Each advertisement database of the one or more advertisement databases 110a is connected to the main server 112 through the communication network 104.

Each of the one or more communication devices 102 and the one or more publishers 106 are connected to the main server 112. In an embodiment of the present disclosure, the main server 112 interacts with the one or more communication devices 102 and the one or more ad servers 110 through the communication network 104 (as shown in FIG. 1B). In another embodiment of the present disclosure, the main server 112 interacts with the one or more publishers 106 and the one or more ad servers 110 through the communication network 104 (as shown in FIG. 1C). In yet another embodiment of the present disclosure, the main server 112 interacts with the one or more ad servers 110 and requests of the one or more communication devices 102 through the one or more publishers 106 (as shown in FIG. 1D).

The user 102a and each of the one or more publishers 106 are a requestor of service from the main server 112. Each publisher of the one or more publishers 106 may be any website, web application, mobile application, third party applications and the like. Each publisher may be managed by a media content provider. In an example, XYZ is a news network and a broadcaster of news on television and online platform. The publisher of XYZ news may be a web based platform, mobile app based platform or any individual content provider of media content. In another example, the publisher may be an individual or group providing videos to the video recommendation system 112. Each of the one or more publishers 106 may be associated with a publisher database of the one or more publisher databases 108. Each publisher database of the one or more publisher databases 108 is a database of a digitally processed repository of videos. Each publisher of the one or more publishers 106 is registered on the main server 112.

The main server 112 provides a platform for a real time recommendation of dynamic, adaptive, non-linear and non-sequentially assembled set of videos. The platform is available for video streaming services for the user 102a and each of the one or more publishers 106. The platform may be a web platform, mobile application platform, mobile web platform and the like. In addition, the main server 112 dynamically handles requests of placement of the one or more advertisements and video recommendations. Each request for placement of each advertisement is initiated by corresponding advertiser of the one or more advertisers 110. Moreover, the main server 112 includes the video recommendation system 114, a first database 116 and a second database 118. The video recommendation system 114 services the request of the user 102a and each of the one or more publishers 106 in the real time. In addition, the main server 112 synchronously analyses the interest profile of the user 102a.

The first database 116 is a proprietary database. The first database 116 includes a set of user authentication data and a user profile associated with the user 102a. Also, the first database 116 includes a set of publisher authentication data and a publisher profile associated with each publisher of the one or more publishers 106. The user 102a is identified uniquely by the set of user authentication data. The set of user authentication data includes an email address of the user 102a, a bio-data of the user 102a, an authentication key, a physical location and a standard time and time zone of login. The bio data of the user 102a may include full name, nickname, chronological age, gender and the like. In an embodiment of the present disclosure, the first database 116 is an encrypted database. In another embodiment of the present disclosure, the first database 116 is an unencrypted database.

In addition, the first database 116 stores records of advertisement interaction behavior related to each registered user in the user profile. In an embodiment of the present disclosure, the advertisement interaction behavior corresponds to a click on the advertisement by the user 102a. In another embodiment of the present disclosure, the advertisement interaction behavior corresponds to an impression viewed by the user 102a. In yet another embodiment of the present disclosure, the advertisement interaction behavior corresponds to a sale of product advertised in corresponding advertisement by the user 102a. Further, the first database 116 stores records of past advertisement interaction behavior in corresponding user profile. In addition, the first database 116 stores records of content usage behavior for each user 102a.

Further, the second database 118 is a database of digital processed repository of videos. The second database 118 stores one or more tagged videos. Each tagged video is virtually divisible into one or more tagged fragments. Each tagged video in the second database 118 is associated with a genre and a title. Examples of the genre include but may not be limited to sports, comedy, horror, drama, adventure, science fiction and autobiography. Also, each video may be associated with a popularity index and a number of views. In addition, each video is characterized by a set of technical specifications and non-technical specifications. The set of technical specifications include encoding format, frame rate, bit rate, frame height, frame width, pixel density, video resolution, size of video and the like. Each video may have different set of technical specifications. Each video in the second database 118 may have any encoding format. In an embodiment of the present disclosure, the encoding format is MPEG-4. In another embodiment of the present disclosure, the encoding format is FLV. In yet another embodiment of the present disclosure, the encoding format is AVI. In yet another embodiment of the present disclosure, the encoding format is 3GP. In yet another embodiment of the present disclosure, the encoding format is derived from proprietary codec. Moreover, the set of non-technical specifications include duration of video, a time reference associated with each video, the genre of video and the like.

Each video is tagged with one or more tags of a set of tags. The set of tags may correspond to a context of video, location reference in video, famous persons, events, genres, date, time and the like. In an example, a video of Moto GP race event is divisible into a lap of one or more laps. Each lap corresponds to a relative position of each racer in race chart. Each section may be tagged with the top racer of each lap. In another example, a video of interview of Mike Tyson is divisible into personal life, social life, professional life, struggles, success, events, etc. Each section of the interview of Mike Tyson can be tagged based on context of discussion.

The digital repository of videos in the second database 118 is updated with the one or more tagged videos from one or more sources. The one or more sources may include third party video content providers, the one or more publishers 106, the one or more advertisers, one or more sponsors and the like. Each publisher is a platform that uploads tagged videos to the digital repository of videos in the main server 112. The platform of each publisher may include a web based platform, a mobile application based platform, a web application based platform and the like. Additionally, the digital repository of videos may be updated and managed by the platform administrators. In an embodiment of the present disclosure, each video is manually tagged by the one or more administrators. In another embodiment of the present disclosure, the one or more administrators associated with operations of the main server 112 tag each video based on voice instructions. In yet another embodiment of the present disclosure, each video may be tagged based on speech rendering and analysis. In yet another embodiment of the present disclosure, each video is automatically tagged by the video recommendation system 112. The automatic tagging of each video is done based on context mining and supervised digital fingerprinting of a set of frames. In yet another embodiment of the present disclosure, each video may be tagged by proprietary software and algorithms. In addition, each video may be manually tagged by at least one of the user 102a, the one or more publishers 106, the one or more advertisers and the like. In addition, each video may be tagged by media agency, advertiser, creative agency and the like. Each tag of the set of tags may be rated for ranking each tag and improving search efficiency.

Going further, the set of tags for each video may be updated based on real time determination of frequently used tags, frequently searched tags and less used tags. In addition, the set of tags for each video may be updated based on dynamic meta-tagging. In an embodiment of the present disclosure, the metadata and meta-tagging for each tagged video may performed according to MPEG 7 standard. The MPEG 7 standard is also called as Multimedia Content Description Interface. The set of tags for each video may be updated based on incremental machine learning on the set of tags and the metadata for each tagged video. For example, a video on Sachin may be tagged with Sachin, master blaster, legend, god of cricket, and the like. The video recommendation system 114 may determine the most used keyword to refer to content on Sachin. Let us suppose, in due course of 1 year, the video recommendation system 114 determines that Sachin is frequently searched with "King of Cricket" tag. The video recommendation system 114 updates the database of the set of tags associated with Sachin. In addition, the tags will be associated with any other video currently discussed in the public domain. If the name of Sachin surfaces in any new content related to any award show, then the tags will be automatically attached with the award show video too. The advertisement serving system 114 may present a Gantt chart of set of tags that are temporally classified based on occurrences within search queries and preferences of the users.

The updated set of tags may be determined based on feature detection and correlation in a specific quadrant of one or more frames of the tagged videos. For example, a 10 minute tagged video having a frame rate of 30 fps may be processed by selecting 1 key frame per second and performing feature detection. The feature detection may be based on incremental machine learning. Examples of the feature detection includes but may not be limited to face detection, object detection, motion detection, text detection, moving object detection and the like.

The main server 112 provides the platform to the user 102a, each of the one or more ad servers 110 and each of the one or more publishers 106. The platform may correspond to any one of a website, mobile application, web application, mobile browser based platform. In an embodiment of the present disclosure, the platform is a subscription based paid platform. In another embodiment of the present disclosure, the platform is a pay per view based paid platform. In yet another embodiment of the present disclosure, the platform is a free access, single registration and login based platform. The platform provides a video on demand service and an advertisement serving service. Further, the platform includes but may not be limited to a media player, a list of thumbnails of the one or more tagged videos, recommendation panel, account panel, search panel, preference panel. In addition, the platform includes one or more banner ad slots and a dynamically updatable list of thumbnails for recommendation of the set of assembled videos. The platform provides a video recommendation and video on demand service along with an advertisement serving service. The pre-defined selection criteria includes but may not be limited to a set of intervals of video broadcast, a physical location of the user 102a, an identified name of celebrity and categories of video. The pre-defined selection criteria are based on dates, time zones, days, seasons, physical locations, occasions, identified names, video genres and the like. The set of intervals of video broadcast corresponds to a time reference in the video. For example, the user 102a may be provided with criteria to view all the news aired between 4:00 PM to 4:15 PM of a specific day. In an example, the physical location may be used to narrow down content relevant to the physical location. The user 102a may like to watch videos relevant to the physical location. The physical location may be derived through many techniques. In an embodiment of the present disclosure, the physical location is derived from the global positioning system (hereinafter "GPS") module present in at least one of the one or more communication devices 102 associated with the user 102a. In another embodiment of the present disclosure, the physical location is derived from manual selection of the physical location from a pre-defined list of locations by the user 102a. In yet another embodiment of the present disclosure, the physical location is derived from internet service provider's server's location.

Going further, the user 102a operates the one or more communication devices 102. The user 102a opens an application of the one or more applications installed in the communication device. The user 102a is associated with a registered profile in the main server 112. The user 102a enters the set of authentication data through the at least one of the one or more communication devices 102. Each communication device of the one or more communication devices 102 is registered with the main server 112. The user 102a logs in or registers each communication device of the one or more communication devices 102 with the main server 112. The user 102a provides a set of preference data through at least one of the one or more communication devices 102 to the main server 112. The set of preference data is a subset of the pre-defined selection criteria provided to the user 102a. The video recommendation system 114 is configured to receive the set of preference data and fetch the one or more tagged videos associated with the set of preference data of the user 102a from the second database 118. In addition, the video recommendation system 114 is configured to fragment, segregate, cluster and assemble logical clusters or mapped fragments of one or more fetched videos to obtain the set of assembled videos. Further, the video recommendation system 114 is configured to allocate one or more ad slots in memory reserved for each assembled video. The video recommendation system 114 is configured to insert at least one or more advertisements from the one or more advertisement databases 110a in the one or more ad slots. The video recommendation system 114 is configured to perform recommendations of the set of assembled videos. Further, the video recommendation system 114 is configured to transcode each assembled video of the set of assembled videos into a pre-defined format. The video recommendation system streams each selected assembled video to the one or more communication devices 102.

Further, the video recommendation system 114 receives the set of preference data associated with the user 102a. The set of preference data is selected by the user 102a from the pre-defined selection criteria. In addition, the set of preference data may be generated based on click based selection of tags by the user 102a on the video assembling platform. The set of preference data corresponds to the digitally processed repository of videos. In addition, the video recommendation system 114 receives the set of user authentication data. The video recommendation system 114 compares the set of authentication data corresponding to the user 102a with the set of authentication data in the first database 116. The video recommendation system 114 allows for a login based on a positive comparison of received set of authentication data with the set of the user authentication data present in the first database 116. In an embodiment of the present disclosure, the video recommendation system 114 automatically handles content management associated with the set of preference data and the set of user authentication data. In another embodiment of the present disclosure, the content management associated with the set of preference data of the user 102a and the set of user authentication data is manually handled by the one or more administrators. Each of the one or more administrators handles the content management by utilizing a content management tool. The content management corresponds to management of the user profile, streaming of the assembled video, editing and updating pre-defined selection criteria, editing pages in the user interface and the like.

The video recommendation system 114 creates the user profile based on a received set of user authentication data, the set of preference data and the real time user viewing and selection behavior. The real time viewing and selection behavior corresponds to dynamic variation in the preferences of the user during due course of one or more active sessions of user on the video assembling and video recommendation platform. In an embodiment of the present disclosure, the user profile is created based on a request from the user 102a. In another embodiment of the present disclosure, the user profile is created automatically by the video recommendation system 114. The set of authentication data of the user 102a is stored in the user profile present in the first database 116. In addition, the video recommendation system 114 adds the advertisement interaction behavior of the user 102a in the user profile. Furthermore, the video recommendation system 114 fetches the one or more tagged videos related to the set of preference data of the user 102a from the digitally processed repository of videos. The video recommendation system 114 fetches the one or more tagged videos based on a correlation of the set of tags associated with each tagged video of the one or more tagged videos with the set of preference data associated with the user 102a.

The video recommendation system 114 develops the interest profile of the user 102a. The development of the interest profile of the user 102a is based on an analysis of the set of statistical data. The interest profile of the user 102a includes but may not be limited to a past selection of videos, a past selected tags corresponding to the past set of preference data, a frequency of assembled video views and number of views of each assembled video by the user 102a. Further, the interest profile of the user 102a includes but may not be limited to the physical location of the user, a list of login time and date and a list of communication devices utilized by the user 102a to access the main server 112. Further, the interest profile of the user 102a includes but may not be limited to one or more preferred events, one or more preferred celebrities and one or more preferred locations. In an embodiment of the present disclosure, the video recommendation system 114 fetches the one or more videos based on the interest profile of the user 102a from the digitally processed repository of videos. In another embodiment of the present disclosure, the video recommendation system 114 fetches the one or more videos related to the interest profile of the user 102a from the digitally processed repository of videos present in each publisher database. In yet another embodiment of the present disclosure, the video recommendation system 114 fetches the one or more videos related to the interest profile of the user 102a from physical sources.

The video recommendation system 114 virtually fragments each tagged video of the one or more tagged videos into the one or more tagged fragments. Each tagged video is fragmented into the one or more tagged fragments and each tagged fragment is characterized by length measured in a pre-determined interval of time. For example, the pre-determined interval of time is 5 seconds for each tagged fragment of a 300 seconds video. In an embodiment of the present disclosure, the pre-determined interval of time for each tagged fragment may be manually adjusted by the one or more administrators. In another embodiment of the present disclosure, the pre-determined interval of time for each tagged fragment may be automatically adjusted by the video recommendation system 114 based on proprietary algorithms. Each tagged video is fragmented based on segmentation of the tagged video for each pre-determined interval of time. Also, the fragmentation of each tagged video is a virtual fragmentation in temporary memory of the main server 112.

The video recommendation system 114 virtually segregates one or more mapped fragments of the one or more tagged fragments into one or more logical sets of mapped fragments. In an embodiment of the present disclosure, the one or more mapped fragments are segregated based on a positive mapping of keywords from the set of preference data with the set of tags. The set of tags are associated with each tagged fragment of the one or more tagged fragments. In addition, each tagged videos of the one or more tagged videos in the second database 118 is associated with a set of metadata. In another embodiment of the present disclosure, the one or more mapped fragments are segregated based on the positive mapping of the keywords from the set of preference data with the set of metadata. Each logical set of mapped fragments may correspond to a common tag from each tagged video of the one or more tagged videos.

For example, a user, say ABC provides preferences like Comedy, Jim Carrey and funny to the video recommendation system 114. The video recommendation system 114 fetches one or more tagged videos related to Jim Carrey, Comedy and funny preferences. The video recommendation system 114 fragments each of the one or more videos into tagged fragments. Each tagged fragment may be of 5 second duration. The video recommendation system 114 may segregate the mapped fragments from the tagged fragments based on a positive mapping with the set of preference data of the user ABC.

The video recommendation system 114 mines semantic context information from each mapped fragment of the one or more mapped fragments. In addition, the video recommendation system 114 mines semantic context information from each logical set of mapped fragments of the one or more logical sets of mapped fragments. The semantic context information includes object specific context information and scene specific context information of each mapped fragment and each logical set of mapped fragments. For example, the one or more mapped fragments may be associated with common tags of comedy, movie, Hollywood and Jim Carrey. The video recommendation system 114 mines semantic context information that includes dialogues, music, location, faces and the like. The video recommendation system 114 may mine sentiments of characters in each mapped fragment from feature analysis of audio and faces. The video recommendation system 114 may mine features that include geometrical shapes, color saturation, motion of objects, scene changes, number of scenes, animations and the like. The video recommendation system 114 may mine semantic context information from the each mapped fragment of the one or more mapped fragments that is comparable with the advertisement interaction behavior of the user 102a. The semantic context information may be used to serve context related advertisements to the user 102a in the real time. In addition, the semantic context information may be used to serve recommendations of the set of assembled videos.

Going further, the video recommendation system 114 virtually clusters the one or more logical sets of mapped fragments into one or more logical clusters of mapped fragments. Each logical cluster of mapped fragments is derived from at least one of the one or more logical sets of mapped fragments. For example, the video recommendation system 114 virtually fetches three tagged comedy videos of Jim Carrey. The video recommendation system 114 fragments each of the three tagged comedy videos of Jim Carrey. The mapped fragments out of tagged fragments for each tagged video may be segregated into the logical set of mapped fragments. The mapped fragments for action and comedy tags in the three videos may be segregated to obtain the logical set of mapped fragments. The logical set of mapped fragments for comedy and action tags for each tagged video may be clustered in the logical cluster.

Further, the video recommendation system 114 allocates the one or more advertisement slots in the memory reserved for the assembled video. In an embodiment of the present disclosure, each of the one or more advertisement slots is determined based on a number of bidders available. In another embodiment of the present disclosure, each of the one or more advertisement slots is determined based on ad skipping behavior of the user 102a. In yet another embodiment of the present disclosure, each of the one or more advertisement slots is determined based on ad viewing behavior of the user 102a. In yet another embodiment of the present disclosure, each of the one or more advertisement slots is determined based on advertisement interaction of the user 102a. Further, the one or more advertisement slots correspond to one or more banner based slots and one or more video based slots. In general, each of the one or more banner based slots is an empty reserved space on the platform accessed by the user 102a. The one or more banner based slots can be uploaded with graphical advertisement, flash based advertisement, text based advertisement and the like. In general, each of the one or more video based slots corresponds to empty time slots present in play time of the assembled video. In addition, the ad slot determination is performed based on logical sentiment and context of the video. For example, the user 102a may be watching assembled compilation of homeruns by Mike Trout. The video recommendation system 114 may determine that sports, baseball and Mike Trout as the context relevant for the insertion of advertisement in the nearest advertisement slot. The video recommendation system 114 may serve advertisement in the slot that contains sports, baseball and Mike Trout as tags. Accordingly, the video recommendation system 114 may apply taxonomy to the ontological relationships between different set of tags, preference data, semantic context mining data, the set of metadata and the tagged fragments of videos.

In an example, the one or more ad servers 110 purchase the one or more advertisement slots from the video recommendation system 114. The advertisement exchange is a platform for buying and selling of advertisement inventory between the one or more publishers 106, the video recommendation system 114 and the one or more ad servers 110. The advertisement exchange manages each advertisement slot. Further, the advertisement exchange works as a third party medium for efficient buying and selling of the advertisement inventory. In addition, the advertisement exchange provides services for trading of the one or more advertisement slots between a buyer and a seller. Examples of the advertisement exchange include but may not be limited to Microsoft AdECN, Yahoo Right Media, DoubleClick, AppNexus, OpenX and the like. In an embodiment of the present disclosure, the one or more ad servers 110 deal directly with each other without intervention of the advertisement exchange.

Going further, the one or more ad servers 110 are associated with the demand side platform. The demand-side platform is software for purchasing advertisements in an automated fashion. The demand side platform allows the one or more ad servers 110 to buy the one or more advertisement slots across a range of websites. Furthermore, the demand side platform is a tool that automates purchasing of the one or more advertisement slots on behalf of the one or more ad servers 110. The one or more ad servers 110 use the demand side platform for setting buying parameters of their campaigns and to monitor campaign performance. Examples of the demand side platform include but may not be limited to Google's Invite Media, MediaMath, Turn, DataXu, and X+1. The one or more ad servers 110 programmatically or manually run a plurality of campaign goals. The one or more ad servers 110 set one or more goals according to their business objectives. The one or more advertisers aim at targeting specific group of users interested in the product. In an embodiment of the present disclosure, the one or more advertisers may want to target a specific age group. For example, an advertiser X deals in selling women apparels might want to target women in the age group of 20-35 and have a fixed amount of budget expenditure.

The demand side platform targets the specific group of users and makes a decision of placing the one or more advertisements in the one or more advertisement slots. Moreover, the demand side platform analyzes the plurality of campaign goals and the information related to the user 102a. The information related to the user 102a may include demographic information, geographical information and the like. The information of the user 102a may be tracked through one or more cookies. In addition, the demand side platform receives information about the one or more advertisement slots. The information include but may not be limited to size of advertisements, identifier related to the one or more publishers 106, the content and web traffic related to the one or more publishers 106 website and the like.

The advertisement exchange facilitate the buying and selling of advertisement inventory or advertisement slots through the real time bidding. The real time bidding allows the one or more advertisers to take part in a real time auction facilitated by the advertisement exchange. The demand side platform decides the one or more advertisement slots that the one or more advertisers should buy. The price of each advertisement slot of the one or more advertisement slots is decided through the real time auction. The real time auction takes place in milliseconds before the web page loads. The demand side platform bids on behalf of the one or more advertisers for winning each of the one or more advertisement slots. The real time bidding process eliminates many advertisers from the one or more advertisers as an advertiser with a highest bid is declared the winner of a particular advertisement slot from the one or more advertisement slots.

Further, the video recommendation system 114 inserts at least one type of the one or more advertisements in each allocated advertisement slot of the one or more advertisement slots. The one or more advertisements are inserted based on mining of semantic context information and analysis of the set of preference data. In addition, the one or more advertisement slots are inserted based on the analysis of a dynamic set of conditions. The dynamic set of conditions includes a location associated with the user, user behavior information and information associated with one or more communication devices 102. In addition, the dynamic set of condition includes cookie information, interests of the user, digital fingerprinting information and the like. The one or more advertisements are inserted in the one or more advertisement slots in the real time.

In an embodiment of the present disclosure, each of the one or more advertisements present in each advertisement slot bears a content associated with context of the logical cluster of mapped fragments. For example, the user 102a requests the main server 112 for a video on fighting scenes of Brad Pitt. The video recommendation system 114 derives the user interest to be Brad Pitt. The video recommendation system 114 searches for any advertisement by Brad Pitt. The video recommendation system 114 inserts the video advertisement in at least one advertisement slot.

In addition, the video recommendation system 114 maintains an advertisement database in the second database 118 of the main server 112. The video recommendation system 114 selects the advertisement video based on logical context of the neighboring logical cluster. Further, the advertisement video may be presented for call to action objective. For example, the user may be presented with an advertisement of a specific car and an interactive questionnaire overlaid on top of the advertisement video. The user answers the questionnaire and is targeted with an option for test drive. The details of the user 102a may be transferred to an associated car dealer for arranging test drive for the user. In addition, the interactive questionnaire may be supplemented or complemented by hotspots, images or text on videos.

In an embodiment of the present disclosure, the video recommendation system 114 may automatically set duration of playing each advertisement video. In another embodiment of the present disclosure, the duration of playing each advertisement video may be manually set by the one or more administrators. In yet another embodiment of the present disclosure, the duration of playing each advertisement video may be set based by proprietary applications.

The video recommendation system 114 performs auto volume leveling on each audio segment associated with the one or more mapped fragments or logical clusters of the mapped fragments. For example, the first logical cluster may contain fragments having different volume levels. The video recommendation system 114 may dynamically normalize volume levels on a uniform scale. In addition, the video recommendation system 114 may perform image normalization on each frame of the mapped fragments.

In an embodiment of the present disclosure, the video recommendation system 114 virtually assembles at least one of the one or more logical clusters of mapped fragments and each of one or more inserted advertisements to obtain the set of assembled videos. The video recommendation system 114 assembles the one or more logical clusters of mapped fragments and each of the one or more inserted advertisements in a pre-defined order of preference. Each logical cluster of mapped fragments is clustered based on the analysis of the set of preference data of the user 102a and the semantic context information. For example, the user 102a may provide preferences like adventure, Nicholas Cage, movie and fighting scenes. The one or more tagged video with tags of adventure and Nicholas Cage and movie may be tagged with specific fighting scenes. The video recommendation system 114 mines semantic context information from each tagged video. The video recommendation system searches for fight related keywords from rendered speeches, scene detection, object movement, music, speech analysis, tone analysis and the like. The semantic context information may be used to automatically tag, fragment, cluster or assemble videos on demand. In an embodiment of the present disclosure, the real time streaming of the virtually assembled logical clusters of mapped fragments is a selective playback of section of the one or more tagged videos.

The video recommendation system 114 removes duplicate tags from set of tags of the real time and dynamically assembled video in the temporary memory of the main server 112. The duplicate tags along the set of metadata of the assembled video are flushed in the disk for faster transmission and caching of the assembled video on different communication devices.

In an embodiment of the present disclosure, the pre-defined order of preference is derived from the set of preference data, the user profile and the semantic context information mined from the activities of user 102a. In another embodiment of the present disclosure, the pre-defined order of preference is derived from preferences of users with similar user profiles and situations. In another embodiment of the present disclosure, the video recommendation system 114 virtually assembles at least one of the one or more logical clusters of mapped fragments in a dynamically generated pre-defined order of preference. The dynamically generated pre-defined order of preference is based on a real time viewing and selection behavior of the user 102a. In an embodiment of the present disclosure, the pre-defined order of preference corresponds to a linear and non-sequential assembling of the one or more logical set of mapped fragments. In another embodiment of the present disclosure, the pre-defined order of preference corresponds to a non-linear and non-sequential assembling of the one or more logical set of mapped fragments. Each logical set of mapped fragments is a virtually clustered in the temporary memory of the main server 112. In yet another embodiment of the present disclosure, the pre-defined order of preference corresponds to sequential assembling of the one or more logical set of mapped fragments. The video recommendation system 114 presents a personalized video solution for each user 102a.

In an example, a person, say X selects tags corresponding to sports. The person (X) selects tags corresponding to Mike Tyson and boxing. In addition, the person selects the knockout tag from the pre-defined selection criteria. The knockout moment is often an ending portion of a boxing match. The video recommendation system 114 fetches the one or more tagged videos associated to matches of Mike Tyson. The video recommendation system 114 searches for a knockout tag in at least one of the one or more pre-defined sections of each tagged video. The video recommendation system 114 fragments each tagged video of Mike Tyson into tagged fragments and segregates logical set of mapped fragments for knockout by Mike Tyson tag from other tagged clips of Mike Tyson. The video recommendation system 114 may cluster each logical set of mapped fragments to obtain logical clusters of mapped fragments. The logical clusters may be assembled in the real time to obtain the assembled video. The video recommendation system 114 allocates the one or more advertisement slots in the memory reserved for the assembled video. The one or more advertisement slots may be inserted with video advertisements of Mike Tyson or Boxing. In addition, the video recommendation system 114 may assemble each logical cluster or mapped fragments and inserted advertisements. The video recommendation system 114 recommends the set of assembled videos related to knockouts by Mike Tyson in the real time. The video recommendation system 114 dynamically serves a reassembled video to the person (X) in the real time upon a click on the any recommended video of the set of assembled videos.

Each assembled video of the set of assembled videos is a cluster of the one or more mapped clips corresponding to the interest profile and the user profile associated with the user 102a. The video recommendation system 114 recommends the set of assembled videos to the associated user 102a. The recommendation of the set of assembled videos is performed based on the analysis of interest profile of the user 102a and the semantic context information of the one or more tagged videos. Further, the recommendation of the set of assembled videos is done through one or more techniques. In an embodiment of the present disclosure, the recommendation of the set of assembled videos is done based on a technique of notification through a pop up notification. In another embodiment of the present disclosure, the recommendation of the set of assembled videos is done based on the technique of notification through a thumbnail based sidebar list. In yet another embodiment of the present disclosure, the recommendation of the set of assembled videos is done based on the technique of notification through a dropdown list. In yet another embodiment of the present disclosure, the recommendation of the set of assembled videos is done based on the notification through an expandable list of the set of assembled videos. In yet another embodiment of the present disclosure, the recommendation of the set of assembled videos is done based on the notification through one or more graphic tickers. In yet another embodiment of the present disclosure, the recommendation of the set of assembled videos is done by redirection to a new web page. In yet another embodiment of the present disclosure, the recommendation of the set of assembled videos is done based on an email notification.

The user 102a may request to stream the assembled video that includes specific segments of 360° videos (or immersive videos), the tagged set of videos and a live video (as shown in FIG. 1E). The main server 112 is associated with a live media server 120. The live media server 120 is a high bandwidth media server that is configured to stream live videos to each communication device of the one or more communication devices 102. The video recommendation system 114 virtually fetches and segregates the one or more mapped fragments of the 360° videos and the one or more tagged videos. The mapped fragments of 360° videos and mapped fragments of tagged videos are derived from comparison of the keywords from the set of preference data with tags of the 360° videos and traditional videos. In addition, the video recommendation system 114 requests a live media server 120 for live streaming of the live video. The video recommendation system 114 virtually assembles the mapped fragments of 360° videos and mapped fragments of videos. The video recommendation system 114 streams the virtually assembled mapped fragments of 360° videos and the mapped fragments of videos. In addition, the video recommendation system 114 switches from the assembled content to the live video received from the live media server in the real time.

In an embodiment of the present disclosure, the video recommendation system 114 determines a real time network bandwidth associated with the one or more communication devices 102 of the user 102a. The video recommendation system 114 enable bandwidth based targeting of advertisements on each of the one or more communication devices 102 associated with the user 102a. For example, the user 102a may have a slow network that doesn't supports seamless streaming of high bitrate videos. The video recommendation system 114 may allocate less advertisement slots with lower bitrate advertisement videos inserted in the real time.

The video recommendation system 114 transcodes the set of assembled videos into a pre-defined video format. The video recommendation system utilizes a codec to transcode the set of assembled videos. The set of assembled videos is transcoded to enable adaptive bitrate streaming on each communication device of the one or more communication devices 102. The set of assembled videos is transcoded based on one or more device parameters and one or more network parameters. The one or more device parameters include screen size, screen resolution, pixel density and the like. Further, the one or more network parameters include an IP address, network bandwidth, maximum bitrate support over network, throughput, connection strength, location of requesting server and the like. In an example, the user 102a may be using a laptop with a limited bandwidth insufficient for high definition streaming of videos. Accordingly, the video recommendation system 114 transcodes set of assembled videos in format up-loadable from the main server 112. In another example, the user 102a may be using a smartphone with a low bandwidth and a lower display resolution. Accordingly, the video recommendation system 114 transcodes the set of assembled videos in the format viewable for the lower display resolution screens. Further, the video recommendation system 114 utilizes salt stack to scale up and down transcoding requirements. The salt stack utilizes shell scripts to execute FFMPEG in the main server 112.

In an embodiment of the present disclosure, the video recommendation system 114 transcodes set of assembled videos in 144p quality. In another embodiment of the present disclosure, the video recommendation system 114 transcodes set of assembled videos in 240p quality. In yet another embodiment of the present disclosure, the video recommendation system 114 transcodes the set of assembled videos in 360p quality. In yet another embodiment of the present disclosure, the video recommendation system 114 transcodes set of assembled videos in 480p quality. In yet another embodiment of the present disclosure, the video recommendation system 114 transcodes the set of assembled videos in 720p quality. In yet another embodiment of the present disclosure, the video recommendation system 114 transcodes the set of assembled videos in 1080p quality. In yet another embodiment of the present disclosure, the video recommendation system 114 transcodes the set of assembled videos in any standard quality.

In addition, the video recommendation system 114 transrates and trans-sizes the assembled video to enable adaptive streaming for each communication device of the one or more communication devices 102. The video recommendation system 114 transcodes the assembled in any standard video coding format, container and audio coding format. Examples of the video coding format includes but may not be limited to MPEG-2 Part 2, MPEG-4 Part 2, H.264 (MPEG-4 Part 10), HEVC, Theora, Real Video RV40, VP9, and AV1. Examples of the container includes but may not be limited to Matroska, FLV, MPEG-4 part 12, VOB, HTML and real media. Example of the audio coding format includes but may not be limited to MP3, AAC, Vorbis, FLAC, and Opus. In an embodiment of the present disclosure, the assembled video is in the MP4 file format. In another embodiment of the present disclosure, the assembled video in the matroska file format. In yet another embodiment of the present disclosure, the assembled video is in the AVI file format. In yet another embodiment of the present disclosure, the assembled video is in the FLV file format. In yet another embodiment of the present disclosure, the assembled video is in the 3GP file format.

The assembled video is transcoded based on an audio codec and a video codec. The audio codec and the video codec may be any standard or proprietary codec. Example of the video codecs include but may not be limited to H.265/MPEG-H HEVC codec, H.264/MPEG-4 AVC codec, H.263/MPEG-4 codec, H.263/MPEG-4 Part 2 codec, H.262/MPEG-2 codec and ACT-L3 codec. The compression performed by the video codecs on the assembled video is a lossy compression. In addition, the video recommendation system 114 utilizes a media streaming communication protocol to stream the real time and dynamically assembled video on each of the one or more communication devices 102. In an embodiment of the present disclosure, the media streaming communication protocol is a HTTP live streaming (hereinafter "HLS") protocol. In another embodiment of the present disclosure, the media streaming communication protocol is a MPEG based dynamic adaptive streaming over HTTP (hereinafter "MPEG-DASH") protocol.

The video recommendation system 114 renders the set of assembled videos for addition of one or more interactive elements and a bi-directional flow to rendered video. The one or more interactive elements include forward playback, reverse playback, fast playback and slow playback. In addition, the one or more interactive elements include touch based navigation option, swipe based navigation option, click based navigation option, voice based navigation and motion based navigation option and the like.

Further, the video recommendation system 114 updates the user profile of the user 102a based on variation in the set of preference data. In addition, the video recommendation system 114 updates the set of assembled videos in the digitally processed repository of videos in the real time. In an example, the set of assembled videos may be recommended to any other user having a similar user profile.

It may be noted that in FIG. 1A, FIG. 1B, FIG. 1C and FIG. 1D and FIG. 1E, the user 102a accesses the assembled video from the one or more communication devices 102 through the main server 112; however, those skilled in the art would appreciate that more number of users associated with more number of communication devices access assembled videos from more number of main servers. It may be noted that in FIG. 1A, FIG. 1B, FIG. 1C, FIG. 1D and FIG. 1E, the main server 112 is the provider of video assembling and recommendation service; however, those skilled in the art would appreciate that more number of main servers synchronously provide video assembling and recommendation service. It may be noted that in FIG. 1A, FIG. 1B, FIG. 1C, FIG. 1D and FIG. 1E, the one or more communication devices 102 is connected to the main server 112 through the communication network 104; however, those skilled in the art would appreciate that more number of communication devices are connected to more number of main servers through more number of communication networks.

FIG. 2 illustrates an example of a real time, dynamic, adaptive and non-sequential assembling of one or more tagged fragments. In the example, the one or more tagged videos includes a first video (V1), a second video (V2) and a third video (V3). The video recommendation system 114 receives the request of service from the user 102a through the communication network 114. The user 102a provides the set of preference data to the video recommendation system 114. The video recommendation system 114 fetches the first video (V1), the second video (V2) and the third video (V3) from the second database 118. In addition, the one or more pre-defined sections of the first video (V1), the second video (V2) and the third video (V3) are tagged with the set of tags. The video recommendation system 114 fragments and logically clusters the first video (V1) into a first logical cluster (V1C1), a second logical cluster (V1C2), a third logical cluster (V1C3), a fourth logical cluster (V1C4), a fifth logical cluster (V1C5) and a sixth logical cluster (V1C6). In addition, the video recommendation system 114 fragments and logically clusters a seventh logical cluster (V1C7) and an eighth logical cluster (V1C8). Accordingly, the video recommendation system 114 fragments and logically clusters the second video (V2) into a first logical cluster (V2C1), a second logical cluster (V2C2) and a third logical cluster (V2C3). The video recommendation system 114 clusters a fourth logical cluster (V2C4), a fifth logical cluster (V2C5) and a sixth logical cluster (V2C6). In addition, the video recommendation system 114 clusters a seventh logical cluster (V2C7), an eighth logical cluster (V2C8) and a ninth logical cluster (V2C9). The video recommendation system 114 performs similar operations on the third video (V3). The fragmentation of the first video (V1), the second video (V2) and third video (V3) is done for the pre-determined interval of time. The first set of logical clusters (V1C1-V1C8), the second set of logical clusters (V2C1-V2C9) and the third set of logical clusters (V3C1-V3C6) includes 8, 9 and 6 logical clusters of fragments respectively. The video recommendation system 114 inserts a first advertisement (AD1), a second advertisement (AD2), a third advertisement (AD3), a fourth advertisement (AD4), a fifth advertisement (AD5) and a sixth advertisement (AD6). The insertion is performed in one or more advertisements slots allocated in the assembled video.

The video recommendation system 114 non-linearly, non-sequentially and virtually assembles the selected logical cluster (V2C4, V1C2, V3C4, V1C3, V2C5, V3C1 and V1C6) and the selected advertisements (AD1, AD2, AD3, AD4, AD5 and AD6) to obtain the assembled video. The assembled video is transcoded into the pre-defined format by the video recommendation system 114. The assembled video in transcoded format is streamed to the user 102a in the real time. The assembled video may be recommended on the one or more communication devices 102 of the user 102a.

FIG. 3 illustrates a block diagram 300 of the video recommendation system 114, in accordance with various embodiments of the present disclosure. It may be noted that to explain the system elements of the FIG. 3, references will be made to the system elements of the FIG. 1A, FIG. 1B, FIG. 1C, FIG. 1D and FIG. 1E. The block diagram 300 includes a reception module 302, a creation module 306, a development module 304, a fetching module 308, a fragmentation module 310 and a segregation module 312. In addition, the block diagram 300 includes a mining module 314, a clustering module 316, an assembling module 318, a recommendation engine 320, a transcoding module 322, a rendering module 324 and an update engine 326.

The reception module 302 receives the set of preference data associated with the user 102 from the pre-defined selection criteria and the set of user authentication data. The predefined selection criteria corresponds to the digitally processed repository of videos (as discussed in detailed description of FIG. 1A). Further, the creation module 304 creates the user profile that corresponds to the received set of user authentication data and the set of preference data. The user profile includes the set of preference data segregated on the basis of pre-defined selection criteria, the set of user authentication data, the past set of preference data, a physical access location of the user 102a and a bio data of the user 102a. The set of user authentication data includes an email address, a bio data of the user 102a, an authentication key, a physical location and a time of request of video (as discussed in detailed description of FIG. 1A). The development module 306 develops the interest profile of the user 102a. The development of the interest profile of the user 102a is based on the analysis of the set of statistical data (as provided above in the detailed description of the FIG. 1A).

The fetching module 308 fetches the one or more tagged videos related to the set of preference data of the user 102a from the digitally processed repository of videos. The one or more tagged videos are fetched based on the correlation of the set of tags associated with each video of the one or more tagged videos with the set of preference data associated with the user 102a (as discussed in detailed description of FIG. 1A). Further, the fragmentation module 310 fragments each tagged video of the one or more tagged videos into the one or more tagged fragments. Each tagged video is fragmented into the one or more tagged fragments and each tagged fragment is characterized by the pre-determined interval of time. Each tagged video is fragmented based on segmentation of the tagged video for each pre-determined interval of time (as discussed in detailed description of FIG. 1A). The segregation module 312 segregates the one or more mapped fragments of the one or more tagged fragments into the one or more logical sets of mapped fragments. The one or more mapped fragments are segregated based on the positive mapping of keywords from the set of preference data with the set of tags associated with each tagged fragment of the one or more tagged fragments.

Further, the mining module 314 mines the semantic context information from each mapped fragment of the one or more mapped fragments. In addition, the mining module 314 mines the semantic context information from each logical set of mapped fragments of the one or more logical sets of mapped fragments. The semantic context information includes the object specific context information and the scene specific context information of each mapped fragment and each logical set of mapped fragments (as discussed in detailed description of FIG. 1A). Further, the clustering module 316 clusters the one or more logical sets of mapped fragments into the one or more logical clusters of mapped fragments.

Furthermore, the assembling module 318 assembles at least one of the one or more logical clusters of mapped fragments and each of the one or more advertisements present in each advertisement slots to obtain the assembled video. The assembling module 318 assembles at least one of the one or more logical clusters of mapped fragments and each of the one or more advertisements in the pre-determined order of preference. Each logical cluster of mapped fragments is assembled based on the analysis of the set of preference data and the semantic context information (as discussed in the detailed description of FIG. 1A).

The recommendation engine 320 recommends the set of assembled videos. The recommendation of the set of assembled videos is performed based on the analysis of interest profile of the user 102a and the mined semantic context information. Also, the recommendation of the set of assembled videos is done through the one or more techniques (as provided above in the detailed description of the FIG. 1A). The transcoding module 322 transcodes each assembled video of the set of assembled videos into the pre-defined format and streams each selected assembled video to the communication device 102 (as mentioned above in the detailed description of the FIG. 1A).

Further, the transcoding module 322 transcodes the set of assembled videos into the pre-defined video format. The transcoding module utilized the codec to transcode the set of assembled videos. The set of assembled videos is transcoded to enable adaptive bitrate streaming on each of the one or more communication devices 102. The adaptive bitrate streaming is based on the one or more device parameters and the one or more network parameters. The one or more device parameters include screen size, screen resolution, pixel density and the like. The one or more network parameters include the IP address, network bandwidth, maximum bitrate support over network, throughput, connection strength and location of requesting server.

The rendering module 324 renders the set of assembled videos for addition of the one or more interactive elements and bi-directional flow (as discussed in detailed description of FIG. 1A). In addition, the update engine 326 updates the set of assembled videos in the digitally processed repository of videos Also, the update engine 326 updates the dynamic set of conditions, the set of authentication data and the user profile of the user 102a in the real time. The user profile is updated based on the variations in the set of preference data.

FIGS. 4A and 4B illustrate a flow chart 400 for recommending the one or more dynamic, adaptive and non-sequentially assembled videos, in accordance with various embodiments of the present disclosure. It may be noted that to explain the process steps of flowchart 400, references will be made to the system elements of the FIG. 1A, FIG. 1B, FIG. 1C, FIG. 1D and the FIG. 3. It may also be noted that the flowchart 400 may have lesser or more number of steps.

The flowchart 400 initiates at step 402. Following step 402, at step 404, the reception module 302 receives the set of preference data associated with the user 102 from the pre-defined selection criteria and the set of user authentication data. The predefined selection criteria correspond to the digitally processed repository of videos. At step 406, the development module 306 develops the interest profile of the user 102a. At step 408, the fetching module 308 fetches the one or more tagged videos related to the set of preference data of the user 102a from the digitally processed repository of videos. The one or more tagged videos are fetched based on the correlation of the set of tags associated with each video of the one or more tagged videos with the set of preference data associated with the user 102a. At step 410, the fragmentation module 310 fragments each tagged video of the one or more tagged videos into the one or more tagged fragments. Each tagged video is fragmented into the one or more tagged fragments and each tagged fragment is characterized by the pre-determined interval of time. Each tagged video is fragmented based on segmentation of the tagged video for each pre-determined interval of time. At step 412, the segregation module 312 segregates the one or more mapped fragments of the one or more tagged fragments into the one or more logical sets of mapped fragments. The one or more mapped fragments are segregated based on the positive mapping of keywords from the set of preference data with the set of tags associated with each tagged fragment of the one or more tagged fragments. At step 414, the mining module 314 mines the semantic context information from each mapped fragment of the one or more mapped fragments. In addition, the mining module 314 mines the semantic context information from each logical set of mapped fragments of the one or more logical sets of mapped fragments. The semantic context information includes the object specific context information and the scene specific context information of each mapped fragment and each logical set of mapped fragments. At step 416, the clustering module 316 clusters the one or more logical sets of mapped fragments into the one or more logical clusters of mapped fragments. At step 418, the assembling module 320 assembles at least one of the one or more logical clusters of mapped fragments and each of the one or more advertisements present in each advertisement slots to obtain the set of assembled videos. The assembling module 318 assembles at least one of the one or more logical clusters of mapped fragments and each of the one or more advertisements in the pre-determined order of preference. Each logical cluster of mapped fragments is assembled based on the analysis of the set of preference data and the semantic context information. At step 420, the recommendation engine 320 recommends the set of assembled videos on each of the one or more communication devices 102 in the real time. The flowchart 400 terminates at step 422.

It may be noted that the flowchart 400 is explained to have above stated process steps; however, those skilled in the art would appreciate that the flowchart 400 may have more/less number of process steps which may enable all the above stated embodiments of the present disclosure.

FIG. 5 illustrates a block diagram of a computing device 500, in accordance with various embodiments of the present disclosure. The computing device 500 includes a bus 502 that directly or indirectly couples the following devices: memory 504, one or more processors 506, one or more presentation components 508, one or more input/output (I/O) ports 510, one or more input/output components 512, and an illustrative power supply 514. The bus 502 represents what may be one or more buses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device 500 that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 500 typically includes a variety of computer-readable media. The computer-readable media can be any available media that can be accessed by the computing device 500 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. The memory 504 may be removable, non-removable, or a combination thereof. Exemplary hardware devices include solid-state memory, hard drives, optical-disc drives, etc. The computing device 500 includes one or more processors that read data from various entities such as memory 504 or I/O components 512. The one or more presentation components 508 present data indications to a user or other device. Exemplary presentation components include a display device, speaker, printing component, vibrating component, etc. The one or more I/O ports 510 allow the computing device 500 to be logically coupled to other devices including the one or more I/O components 512, some of which may be built in. Illustrative components include a microphone, joystick, game pad, satellite dish, scanner, printer, wireless device, etc.

The present disclosure has several advantages over the prior art. The present disclosure provides a solution for real time recommendation of assembled videos based on the interest profile of the user. The present disclosure takes into maps the user preference behavior. The mapping of the user preference behavior facilitates in identifying relevant content for the user. The present disclosure facilitates clustering of clips corresponding to multiple videos having same tags. The assembled video provides a one video solution to varied user preferences. The present disclosure provides a method efficient in mining and attaching tags corresponding to multiple sections of the video. The assembled video solves tedious video reediting work of publishers. The present disclosure facilitates a seamless viewing experience bundled with personalized video solution within a single assembled video for the users. The present solution saves the switching and selection and sorting time of user by presenting a seamless single video having multiple segments that are related to the preferences of the user.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for recommending one or more dynamic, adaptive and non-sequentially assembled videos, the method comprising:
receiving at a video recommendation system with a processor, a set of preference data associated with a user from a pre-defined selection criteria and a set of user authentication data, wherein the pre-defined selection criteria corresponds to a digitally processed repository of videos;
developing at the video recommendation system with the processor, an interest profile of the user, wherein the interest profile being developed based on an analysis of a set of statistical data;
fetching at the video recommendation system with the processor, one or more tagged videos related to the set of preference data of the user from the digitally processed repository of videos, wherein the one or more tagged videos being fetched based on a correlation of a set of tags associated with each video of the one or more tagged videos with the set of preference data associated with the user;
fragmenting at the video recommendation system with the processor, each tagged video of the one or more tagged videos into one or more tagged fragments, wherein each tagged video being fragmented into the one or more tagged fragments, wherein each tagged fragment being characterized by a pre-determined interval of time and wherein each tagged video being fragmented based on segmentation of the tagged video for each pre-determined interval of time;
segregating at the video recommendation system with the processor, one or more mapped fragments of the one or more tagged fragments into one or more logical sets of mapped fragments, wherein the one or more mapped fragments being segregated based on a positive mapping of keywords from the set of preference data with the set of tags associated with each tagged fragment of the one or more tagged fragments;
mining at the video recommendation system with the processor, semantic context information from each mapped fragment of the one or more mapped fragments and each logical set of mapped fragments of the one or more logical sets of mapped fragments, wherein the semantic context information comprises an object specific context information and scene specific context information of each mapped fragment and each logical set of mapped fragments; and
clustering at the video recommendation system with the processor, the one or more logical sets of mapped fragments into corresponding one or more logical clusters of mapped fragments;
assembling at the video recommendation system with the processor, at least one of the one or more logical clusters of mapped fragments in a pre-defined order of preference to obtain a set of assembled videos, wherein each logical cluster of mapped fragments being assembled based on an analysis of the semantic context information and the set of preference data; and
recommending at the video recommendation system with the processor, the set of assembled videos in real time, wherein the set of assembled videos being recommended based on the analysis of the semantic context information and the interest profile of the user and wherein the set of assembled videos being recommended through one or more techniques.

2. The computer-implemented method as recited in claim 1, further comprising creating at the video recommendation system with the processor, a user profile corresponding to the received set of user authentication data and the set of preference data, wherein the user profile comprises the set of preference data segregated on a basis of the pre-defined selection criteria, the set of user authentication data, a past set of preference data, a physical access location of the user and a bio data of the user and wherein the set of user authentication data comprises an email address, the bio data of the user, an authentication key, a physical location and a time of request of video.

3. The computer-implemented method as recited in claim 2, further comprising updating at the video recommendation system with the processor, the set of assembled videos in the digitally processed repository of videos, the user profile of the user based on variations in the set of preference data, the interest profile of the user and the set of user authentication data in the real time.

4. The computer-implemented method as recited in claim 2, wherein the pre-defined order of preference being derived from the set of preference data, the semantic context information, the interest profile of the user, the user profile of the user and user profiles of any user having similar preferences.

5. The computer-implemented method as recited in claim 1, further comprising transcoding at the video recommendation system with the processor, the set of assembled videos into a pre-defined video format by utilizing a codec, wherein each of the set of assembled videos being transcoded to enable adaptive bitrate streaming based on one or more device parameters and one or more network parameters, wherein the one or more device parameters comprises screen size, screen resolution and pixel density and wherein the one or more network parameters comprises an IP address, network bandwidth, maximum bitrate support over network, throughput, connection strength and location of requesting server.

6. The computer-implemented method as recited in claim 1, further comprising rendering at the video recommendation system with the processor, the set of assembled videos for adding one or more interactive elements and bi-directional flow.

7. The computer-implemented method as recited in claim 1, wherein the set of statistical data comprises a current set of preference data, the past set of preference data, the set of user authentication data, a physical location of the user, a bio data of the user, wherein the set of user authentication data comprises an email address, a user id, an authentication key and a time of request of video and wherein the bio data of the user comprises a first name, a middle name, a last name, a nickname, gender and a chronological age.

8. The computer-implemented method as recited in claim 1, wherein the set of user authentication data comprises an email address, a bio-data of the user, an authentication key, a physical location and a standard time and time zone of login.

9. The computer-implemented method as recited in claim 1, wherein the pre-defined selection criteria being based on date, time zone, day, season, physical location, occasion, an identified name and a video genre.

10. The computer-implemented method as recited in claim 1, wherein each tagged video of the one or more tagged videos being manually tagged by at least one of one or more publishers.

11. The computer-implemented method as recited in claim 1, wherein each tagged video of the one or more tagged videos being manually tagged by at least one of one or more system administrators.

12. The computer-implemented method as recited in claim 1, wherein each tagged video of the one or more tagged videos being tagged based on voice instructions of one or more system administrators.

13. The computer-implemented method as recited in claim 1, wherein each tagged video of the one or more tagged videos being tagged based on audio rendering and analysis.

14. The computer-implemented method as recited in claim 1, wherein the one or more techniques comprises a pop up notification, a thumbnail based sidebar list, a drop-down list, an expandable list, one or more graphic tickers, a redirection to a new web page and an email notification.

15. A computer system comprising:
one or more processors; and
a memory coupled to the one or more processors, the memory for storing instructions which, when executed by the one or more processors, cause the one or more processors to perform a method for recommending one or more dynamic, adaptive and non-sequentially assembled videos, the method comprising:
receiving at a video recommendation system, a set of preference data associated with a user from a pre-defined selection criteria and a set of user authentication data, wherein the pre-defined selection criteria corresponds to a digitally processed repository of videos;
developing at the video recommendation system, an interest profile of the user, wherein the interest profile being developed based on an analysis of a set of statistical data;
fetching at the video recommendation system, one or more tagged videos related to the set of preference data of the user from the digitally processed repository of videos, wherein the one or more tagged videos being fetched based on a correlation of a set of tags associated with each video of the one or more tagged videos with the set of preference data associated with the user;
fragmenting at the video recommendation system, each tagged video of the one or more tagged videos into one or more tagged fragments, wherein each tagged video being fragmented into the one or more tagged fragments, wherein each tagged fragment being characterized by a pre-determined interval of time and wherein each tagged video being fragmented based on segmentation of the tagged video for each pre-determined interval of time;
segregating at the video recommendation system, one or more mapped fragments of the one or more tagged fragments into one or more logical sets of mapped fragments, wherein the one or more mapped fragments being segregated based on a positive mapping of keywords from the set of preference data with the set of tags associated with each tagged fragment of the one or more tagged fragments;

mining at the video recommendation system, semantic context information from each mapped fragment of the one or more mapped fragments and each logical set of mapped fragments of the one or more logical sets of mapped fragments, wherein the semantic context information comprises an object specific context information and scene specific context information of each mapped fragment and each logical set of mapped fragments; and
clustering at the video recommendation system, the one or more logical sets of mapped fragments into corresponding one or more logical clusters of mapped fragments;
assembling at the video recommendation system, at least one of the one or more logical clusters of mapped fragments in a pre-defined order of preference to obtain a set of assembled videos, wherein each logical cluster of mapped fragments being assembled based on an analysis of the semantic context information and the set of preference data; and
recommending at the video recommendation system, the set of assembled videos in real time, wherein the set of assembled videos being recommended based on the analysis of the semantic context information and the interest profile of the user and wherein the set of assembled videos being recommended through one or more techniques.

16. The computer system as recited in claim 15, further comprising creating at the video recommendation system, a user profile corresponding to the received set of user authentication data and the set of preference data, wherein the user profile comprises the set of preference data segregated on a basis of the pre-defined selection criteria, the set of user authentication data, a past set of preference data, a physical access location of the user and a bio data of the user and wherein the set of user authentication data comprises an email address, the bio data of the user, an authentication key, a physical location and a time of request of video.

17. The computer system as recited in claim 16, further comprising updating at the video recommendation system, the set of assembled videos in the digitally processed repository of videos, the user profile of the user based on variations in the set of preference data, the interest profile of the user and the set of user authentication data in the real time.

18. The computer system as recited in claim 15, further comprising transcoding at the video recommendation system, the set of assembled videos into a pre-defined video format by utilizing a codec, wherein each of the set of assembled videos being transcoded to enable adaptive bitrate streaming based on one or more device parameters and one or more network parameters, wherein the one or more device parameters comprises screen size, screen resolution and pixel density and wherein the one or more network parameters comprises an IP address, network bandwidth, maximum bitrate support over network, throughput, connection strength and location of requesting server.

* * * * *